US012547179B2

United States Patent
Shin et al.

(10) Patent No.: US 12,547,179 B2
(45) Date of Patent: Feb. 10, 2026

(54) ROBOT AND CONTROL METHOD THEREOF

(71) Applicant: SAMSUNG ELECTRONICS CO., LTD., Suwon-si (KR)

(72) Inventors: Dongeui Shin, Suwon-si (KR); Daehwan Jung, Suwon-si (KR); Minsu Hwangbo, Suwon-si (KR); Hyunseok Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 95 days.

(21) Appl. No.: 18/388,294

(22) Filed: Nov. 9, 2023

(65) Prior Publication Data
US 2024/0134380 A1  Apr. 25, 2024
US 2024/0231362 A9  Jul. 11, 2024

Related U.S. Application Data

(63) Continuation of application No. PCT/KR2023/015827, filed on Oct. 13, 2023.

(30) Foreign Application Priority Data

Oct. 20, 2022 (KR) .......................... 10-2022-0135991
Feb. 22, 2023 (KR) .......................... 10-2023-0023843

(51) Int. Cl.
*G05D 1/00* (2024.01)
*G05D 1/628* (2024.01)

(52) U.S. Cl.
CPC .......... *G05D 1/0238* (2013.01); *G05D 1/628* (2024.01)

(58) Field of Classification Search
CPC .... G05D 1/0238; G05D 1/628; G05D 1/2424; G05D 2109/10; G05D 2111/20;
(Continued)

(56) References Cited

U.S. PATENT DOCUMENTS 9,927,518 B2 * 3/2018 Hyun .................... G01S 13/343
10,235,575 B2  3/2019 Michiguchi et al.
(Continued)

FOREIGN PATENT DOCUMENTS

CN  108733041 A  11/2018
EP  3 677 977 A1  7/2020
(Continued)

OTHER PUBLICATIONS

International Search Report dated Jan. 31, 2024 in International Application No. PCT/KR2023/015827.
(Continued)

*Primary Examiner* — Bao Long T Nguyen
(74) *Attorney, Agent, or Firm* — Sughrue Mion, PLLC

(57) ABSTRACT

A robot, includes: a driver; a plurality of sensors; a memory; and at least one processor configured to transmit a first signal for identifying a presence or absence of an object within a sensing area of the plurality of sensors through a first sensor operating in the signal transmitting mode from among the plurality of sensors during a first time period, identify, a second sensor to transmit a second signal during a third time period after elapse of the second time period from among the plurality of sensors, transmit the second signal by operating the identified second sensor in the signal transmitting mode, identify a location of the object based on whether a second reflection signal corresponding to the second signal is received at the second sensor, and control the driver to travel by avoiding the object based on the identified location of the object.

20 Claims, 18 Drawing Sheets

(58) Field of Classification Search
CPC ..... G05D 1/622; G01S 13/931; G01S 17/931; G01S 7/4815; G01S 7/40
See application file for complete search history.

(56) References Cited

U.S. PATENT DOCUMENTS

| | | |
|---|---|---|
| 10,551,473 B2 | 2/2020 | Jukkala |
| 11,666,194 B2 | 6/2023 | Park |
| 11,899,102 B2 | 2/2024 | Lincoln et al. |
| 2006/0173349 A1 | 8/2006 | Chien |
| 2010/0231558 A1 | 9/2010 | Kwak |
| 2014/0009741 A1 | 1/2014 | Levien et al. |
| 2019/0204847 A1 | 7/2019 | Noh et al. |
| 2021/0186289 A1 | 6/2021 | Park |

FOREIGN PATENT DOCUMENTS

| | | |
|---|---|---|
| EP | 3 920 002 A1 | 12/2021 |
| JP | 2003-35774 A | 2/2003 |
| JP | 2006-323618 A | 11/2006 |
| JP | 2008-39497 A | 2/2008 |
| JP | 2010-55422 A | 3/2010 |
| JP | 6388267 B2 | 9/2018 |
| KR | 10-2004-0057111 A | 7/2004 |
| KR | 10-0492540 B1 | 6/2005 |
| KR | 10-0757102 B1 | 9/2007 |
| KR | 10-2017-0088012 A | 8/2017 |
| KR | 10-2019-0081316 A | 7/2019 |
| KR | 10-2021-0070153 A | 6/2021 |
| KR | 10-2432198 B1 | 8/2022 |

OTHER PUBLICATIONS

Written Opinion dated Jan. 31, 2024 in International Application No. PCT/KR2023/015827.
Communication dated Sep. 17, 2025, issued by the European Patent Office in counterpart European Application No. 23880122.9.

* cited by examiner

FIG. 4

| NO | SENSOR IN SIGNAL TRANSMITTING MODE | SIGNAL RECEIVING SENSOR | SIGNAL TRANSMITTING SENSOR AFTER SIGNAL IS RECEIVED |
|---|---|---|---|
| 1 | A | D, (A) | D |
| 2 | A | B, D | D |
| 3 | A | A, B | B |
| 4 | A | Etc | B |
| 5 | B | D | C |
| 6 | B | C, (D) | C |

FIG. 5B

| NO | SIGNAL TRANSMITTING MODE SENSOR | SIGNAL RECEIVING SENSOR | SIGNAL TRANSMITTING SENSOR AFTER SIGNAL IS RECEIVED | LOCATION INFORMATION ||
|---|---|---|---|---|---|
| | | | | NOT RECEIVE REFLECTION SIGNAL | RECEIVE REFLECTION SIGNAL |
| 1 | A | D, (A) | D | 1 | 4, 5, (6) |
| 2 | A | B, D | D | 1, 2 | (3), 4, 5, (6) |
| 3 | A | A, B | B | 1, (2) | (2), 3 |
| 4 | A | Etc | B | ... ||
| 5 | B | D | C | 2, (3) | 4, (5) |
| 6 | B | C, (D) | C | 2, (3) | (3), 4, (5) |

ROBOT AND CONTROL METHOD THEREOF

CROSS-REFERENCE TO RELATED APPLICATION(S)

This application is a bypass continuation of International Application No. PCT/KR2023/015827, filed on Oct. 13, 2023, which is based on and claims priority to Korean Patent Application No. 10-2022-0135991, filed on Oct. 20, 2022, in the Korean Intellectual Property Office and Korean Patent Application No. 10-2023-0023843, filed on Feb. 22, 2023, in the Korean Intellectual Property Office, the disclosures of which are incorporated by reference herein in their entireties.

BACKGROUND

1. Field

The disclosed embodiments relate to a robot traveling a specific space and a control method thereof, and more particularly to a control method of a robot that accurately identifies an object present on a travel path using a plurality of sensors provided in the robot.

2. Description of Related Art

With developments in electronic technology, electronic devices of various types are being developed and supplied, and recently, technological developments for robots providing service to users have become more active. As developments in robot related fields have become active, a demand for sensors for robot movements and performing various roles have also increased.

A robot may include distance sensing sensors (e.g., an ultrasonic sensor, an infrared sensor, a LiDAR, etc.) to sense an object present on a travel path. In this case, a blind spot where detection of an object is not possible according to an angle between the object and the sensor may be generated, and to solve the above, a plurality of sensors may be appropriately used to accurately sense a location of the object.

SUMMARY

A robot, may include: a driver; a plurality of sensors; a memory configured to store information mapped with (i) at least one sensor of the plurality of sensors that is configured to receive a transmitted signal and (ii) a sensor of the plurality of sensors that is configured to transmit a signal after the transmitted signal is received through the at least one sensor for the plurality of sensors, respectively, operating in a signal transmitting mode; and at least one processor configured to transmit a first signal for identifying a presence or absence of an object within a sensing area of the plurality of sensors through a first sensor operating in the signal transmitting mode from among the plurality of sensors during a first time period, identify, based on the first signal being reflected from the object during a second time period after elapse of the first time period and received in at least one sensor operating in a signal receiving mode from among the plurality of sensors, a second sensor to transmit a second signal during a third time period after elapse of the second time period from among the plurality of sensors based on the information stored in the memory and at least one sensor to which a first reflection signal corresponding to the first signal is received, transmit the second signal by operating the identified second sensor in the signal transmitting mode, identify a location of the object based on whether a second reflection signal corresponding to the second signal is received at the second sensor, and control the driver to travel by avoiding the object based on the identified location of the object.

The information stored in the memory may include location information of the object according to whether the second sensor receives the second reflection signal corresponding to the second signal transmitted by the second sensor transmitting the second signal after the second signal is received. The at least one processor may be further configured to identify the location of the object based on whether the second reflection signal is received at the second sensor and information stored in the memory.

The location information of the object stored in the memory may include location information about at least one from among a plurality of first front areas corresponding to a body part of the robot and a plurality of second front areas corresponding to an outer side of the body part of the robot. The at least one processor may be further configured to identify, based on the second reflection signal being received at the second sensor within a pre-set time, at least one area of the plurality of first front areas and the plurality of second front areas as a location corresponding to the object based on first location information of an object corresponding to receiving of the signal from among information stored in the memory.

The at least one processor may be further configured to identify, based on the second reflection signal not being received at the second sensor within the pre-set time, at least one area of the plurality of first front areas and the plurality of second front areas as a location corresponding to the object based on second location information of an object corresponding to not receiving of the signal from among the information stored in the memory.

The at least one processor may be further configured to transmit, based on the first reflection signal not being received in at least one sensor from among the plurality of sensors during a pre-set time from a time-point at which the first signal is transmitted, the first signal by operating a third sensor with a transmitting order after the first sensor from among the plurality of sensors in the signal transmitting mode according to a pre-set transmitting order corresponding to the plurality of sensors.

The at least one processor may be further configured to identify, based on the first signal being reflected from the object and received in at least one sensor from among the plurality of sensors, a distance with the object based on a transmitting time-point of the first signal and a receiving time-point of the first reflection signal, and identify, based on the identified distance being within the pre-set distance, the second sensor to transmit the signal during the third time period from among the plurality of sensors based on information stored in the memory and at least one sensor that received the first reflection signal and transmit the second signal by operating the identified second sensor in the signal transmitting mode.

The plurality of sensors may be configured to be spaced apart by a pre-set distance to a body part of the robot to transmit a signal at a pre-set angle based on a bottom surface.

The plurality of sensors may include four ultrasonic sensors. Two sensors from among the four ultrasonic sensors may have a first angle of view. Remaining two sensors from among the four ultrasonic sensors may have a second angle of view different from the first angle of view.

A control method of a robot storing, in a memory, information mapped with (i) at least one sensor of a plurality of sensors that is configured to receive a transmitted signal and (ii) a sensor of the plurality of sensors that is configured to transmit a signal after the signal is received through the at least one sensor for a plurality of sensors, respectively, operating in a signal transmitting mode, may include: transmitting a first signal for identifying a presence or absence of an object within a sensing area of the plurality of sensors through a first sensor operating in the signal transmitting mode from among the plurality of sensors during a first time period; identifying, based on the first signal being reflected from the object during a second time period after elapse of the first time period and received in at least one sensor operating in a signal receiving mode from among the plurality of sensors, a second sensor to transmit a second signal during a third time period after elapse of the second time period from among the plurality of sensors based on the stored information and at least one sensor to which the first reflection signal corresponding to the first signal is received; transmitting the second signal by operating the identified second sensor in the signal transmitting mode; identifying a location of the object based on whether a second reflection signal corresponding to the second signal is received at the second sensor; and traveling by avoiding the object based on the identified location of the object.

The information stored in the memory may include location information of the object according to whether the second sensor receives the second reflection signal corresponding to the second signal transmitted by the second sensor configured to transmit a second signal after the second signal is received. The identifying a location of the object may include identifying a location of the object based on whether the second reflection signal is received at the second sensor and information stored in the memory.

The location information of the object stored in the memory may include location information about at least one from among a plurality of first front areas corresponding to a body part of the robot and a plurality of second front areas corresponding to an outer side of the body part of the robot. The identifying the location of the object may include identifying, based on the second reflection signal being received at the second sensor within a pre-set time, at least one area of the plurality of first front areas and the plurality of second front areas as a location corresponding to the object based on first location information of an object corresponding to receiving of the signal from among information stored in the memory.

The identifying the location of the object further may include: identifying, based on the second reflection signal not being received at the second sensor within the pre-set time, at least one area of the plurality of first front areas and the plurality of second front areas as a location corresponding to the object based on second location information of an object corresponding to not receiving of the signal from among the information stored in the memory.

The method may further include: transmitting, based on the first reflection signal not being received in at least one sensor from among the plurality of sensors during a pre-set time from a time-point at which the first signal is transmitted, the first signal by operating a third sensor with a transmitting order after the first sensor from among the plurality of sensors in the signal transmitting mode according to a pre-set transmitting order corresponding to the plurality of sensors.

The identifying the second sensor may include: identifying, based on the first signal being reflected from the object and received in at least one sensor from among the plurality of sensors, a distance with the object based on a transmitting time-point of the first signal and a receiving time-point of the first reflection signal; and identifying, based on the identified distance being within a pre-set distance, the second sensor to transmit a signal during the third time period from among the plurality of sensors based on information stored in the memory and at least one sensor that received the first reflection signal.

A non-transitory computer-readable recording medium configured to store computer instructions for a robot to perform an operation when executed by a processor of the robot, the operation may include: transmitting a first signal for identifying a presence or absence of an object within a sensing area of a plurality of sensors through a first sensor operating in a signal transmitting mode from among the plurality of sensors during a first time period; identifying, based on the first signal being reflected from the object during a second time period after elapse of the first time period and received in at least one sensor operating in a signal receiving mode from among the plurality of sensors, a second sensor to transmit a second signal during a third time period after elapse of the second time period from among the plurality of sensors based on the information mapped with at least one sensor configured to receive the transmitted signal and a sensor configured to transmit a signal after the signal is received through the at least one sensor for the plurality of sensors, respectively, operating in the signal transmitting mode which is stored in the memory, and at least one sensor to which the first reflection signal corresponding to the first signal is received; transmitting the second signal by operating the identified second sensor in the signal transmitting mode; identifying a location of the object based on whether a second reflection signal corresponding to the second signal is received at the second sensor; and traveling by avoiding the object based on the identified location of the object.

The information stored in the memory may include location information of the object according to whether the second sensor receives the second reflection signal corresponding to the second signal transmitted by the second sensor configured to transmit a second signal after the second signal is received. The identifying a location of the object may include identifying a location of the object based on whether the second reflection signal is received at the second sensor and information stored in the memory.

The location information of the object stored in the memory may include location information about at least one from among a plurality of first front areas corresponding to a body part of the robot and a plurality of second front areas corresponding to an outer side of the body part of the robot. The identifying the location of the object may include identifying, based on the second reflection signal being received at the second sensor within a pre-set time, at least one area of the plurality of first front areas and the plurality of second front areas as a location corresponding to the object based on first location information of an object corresponding to receiving of the signal from among information stored in the memory.

The identifying the location of the object further may include: identifying, based on the second reflection signal not being received at the second sensor within the pre-set time, at least one area of the plurality of first front areas and the plurality of second front areas as a location corresponding to the object based on second location information of an object corresponding to not receiving of the signal from among the information stored in the memory.

The operation may further include: transmitting, based on the first reflection signal not being received in at least one sensor from among the plurality of sensors during a pre-set time from a time-point at which the first signal is transmitted, the first signal by operating a third sensor with a transmitting order after the first sensor from among the plurality of sensors in the signal transmitting mode according to a pre-set transmitting order corresponding to the plurality of sensors.

The identifying the second sensor may include: identifying, based on the first signal being reflected from the object and received in at least one sensor from among the plurality of sensors, a distance with the object based on a transmitting time-point of the first signal and a receiving time-point of the first reflection signal; and identifying, based on the identified distance being within a pre-set distance, the second sensor to transmit a signal during the third time period from among the plurality of sensors based on information stored in the memory and at least one sensor that received the first reflection signal.

BRIEF DESCRIPTION OF THE DRAWINGS

FIG. 4 is a diagram illustrating a method of identifying a second sensor using information stored in a memory according to one or more embodiments;

FIG. 5A to FIG. 5C are diagrams illustrating a method of identifying a location of an object based on whether a second reflection signal is received at a second sensor according to one or more embodiments;

DETAILED DESCRIPTION

The disclosed embodiments will be described in detail below with reference to the accompanying drawings.

Terms used will be briefly described, and the disclosed embodiments will be described in detail.

The terms used in describing one or more embodiments are general terms selected that are currently widely used considering their function herein. However, the terms may change depending on intention, legal or technical interpretation, and/or emergence of new technologies of those skilled in the related art. Further, in certain cases, there may be terms arbitrarily selected, and in this case, the meaning of the term will be disclosed in greater detail in the corresponding description. Accordingly, the terms used herein are not to be understood simply by its designation but based on the meaning of the term and the overall context of the disclosed embodiments.

Expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor (not shown).

Figure 1:
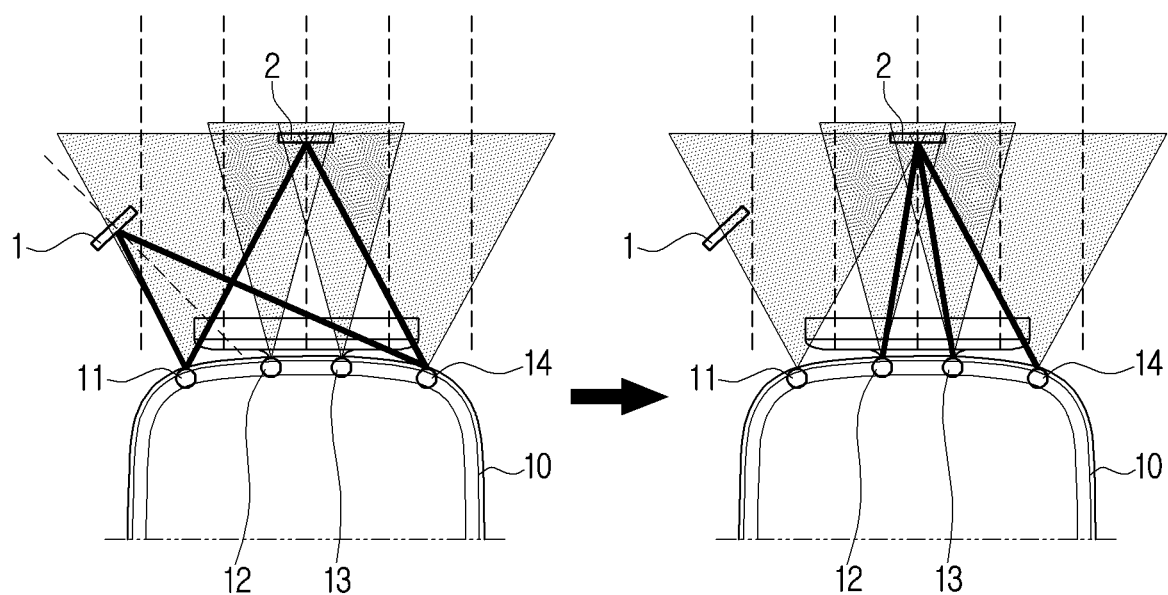
FIG. 1 is a diagram illustrating schematically a control method of a robot according to one or more embodiments.

FIG. 1 is a diagram illustrating schematically a control method of a robot according to one or more embodiments.

Referring to FIG. 1, a robot 10 may arrive at a destination by traveling a travel space. The robot 10 may be implemented as a robot of different types that provides service (e.g., cleaning, delivery, or serving) to a user by traveling a path. For example, the robot 10 may provide a service of transferring an item to a specific location or cleaning while traveling a travel space, but is not limited thereto. The robot 10 may pre-store map information corresponding to the travel space in order to travel the travel space, and travel the space by performing a path generation based therefrom.

The robot 10 may include a plurality of sensors 11 to 14 to identify an object 1 or 2 on a travel path. The robot 10 may transmit a signal using the plurality of sensors 11 to 14, and when the transmitted signal is reflected by an object 1 or 2, identify a location of the object using the reflected signal.

Only one sensor from among the plurality of sensors 11 to 14 may transmit a signal. That is, only one sensor from among the plurality of sensors 11 to 14 may operate in a signal transmitting mode. For example, an A sensor 11 from among the plurality of sensors 11 to 14 may transmit a signal for identifying an object during a first time period, and a B sensor 12 from among the plurality of sensors 11 to 14 may transmit a signal for identifying an object during a pre-set time period after the first time period.

The robot 10 may transmit a signal during a plurality of time periods to determine a location of an object. If an object is present at a first location 1 or present at a second location 2 as in a left drawing in FIG. 1, a signal transmitted during the first time period through the A sensor 11 that is reflected by an object may be received at a D sensor 14. That is, in both cases of the first location 1 and the second location 2, the reflected signal may be received at the D sensor 14, and the robot 10 may transmit a signal during the pre-set time period after the first time period using a sensor other than the A sensor 11 as shown in a right drawing in FIG. 1 to identify whether an object is present at any location from among the first location 1 and the second location 2.

In this case, if the plurality of sensors 11 to 14 operate in the signal transmitting mode in a sequential order (e.g., in an order of an A sensor-a B sensor-a C sensor-a D sensor), time spent for identifying the object may be unnecessarily extended. For example, based on the B sensor operating in the signal transmitting mode during a second time period due to the sequential order despite the D sensor being able to quickly identify an object when operating in the signal transmitting mode during the pre-set time period after the first time period after the A sensor operated in the signal transmitting mode during the first time period in order to identify the object, time from when a pre-set time has passed to when the D sensor operates in the signal transmitting mode may be additionally necessary in order for the robot 10 to determine the location of the object.

Accordingly, various embodiments describing of accurately determining the location of the object through the plurality of sensors provided in the robot, and minimizing an object identification time through an adaptive detection algorithm during this process will be described below.

Figure 2:
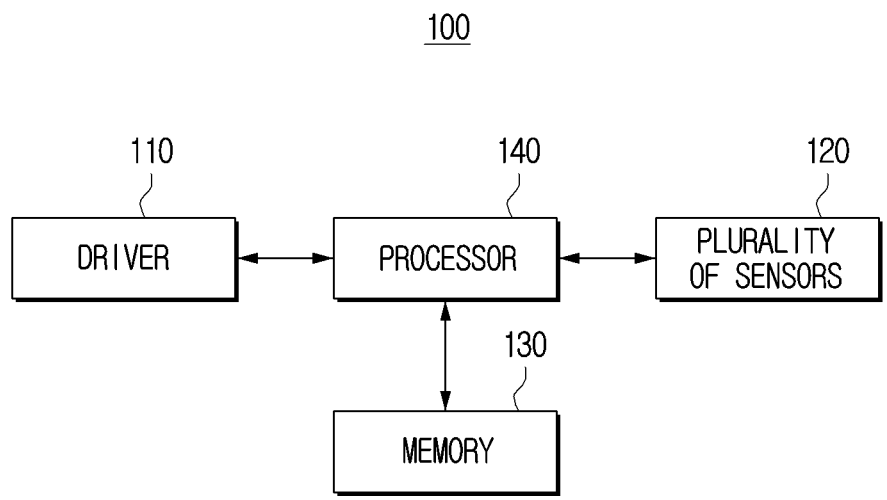
FIG. 2 is a block diagram illustrating a configuration of a robot according to one or more embodiments.

FIG. 2 is a block diagram illustrating a configuration of a robot according to one or more embodiments.

Referring to FIG. 2, a robot 100 may include a driver 110, a plurality of sensors 120, a memory 130, and at least one processor 140.

The driver 110 may be a device that can travel the robot 100. The driver 110 may adjust a travel direction and a travel speed according to control of the at least one processor 140, and the driver may include a power generating device (e.g., a gasoline engine, a diesel engine, a liquefied petroleum gas (LPG) engine, and/or an electric motor according to a fuel (or an energy source) used) that generates power for the robot 100 to travel, a steering device (e.g., manual steering, hydraulics steering, electronic control power steering (EPS), etc.) for adjusting the travel direction, a travel device (e.g., a wheel, a propeller, etc.) that travels the robot 100 according to power. Here, the driver 110 may be modified and implemented according to a travelling type (e.g., a wheel type, a waling type, a flying type, etc.) of the root 100.

The plurality of sensors 120 (hereinafter, referred to as a sensor) may include sensors of various types, The sensor 120 may measure physical quantity or sense an operation state of the robot 100, and convert the measured or sensed information into an electric signal. The sensor 120 may be implemented as an ultrasonic sensor. The ultrasonic sensor may transmit a signal through a sound pulse of a pre-set frequency at a pre-set interval, and measure a distance with an object by receiving the signal (or, sensing data) reflected from the object.

The embodiment is not limited to the above, and the sensor 120 may be implemented as an infrared sensor or a camera sensor. The sensor 120 may include a camera, and the camera may include a lens that focuses visible rays and other optical signals received by being reflected by the object to an image sensor and an image sensor capable of sensing the visible rays and other optical signals. Here, the image sensor may include a 2-dimensional (2D) pixel array which is divided into a plurality of pixels. In addition, the plurality of sensors 120 may include not only a distance sensor such as a light detection and ranging (LiDAR) sensor and a time of fight (ToF) sensor, but also a thermal imaging sensor that reads forms.

However, the embodiment is not limited to the above, and the robot 100 may also obtain the above-described sensing data from an external device through a communication interface (not shown).

The memory 130 may store data necessary for the various embodiments. The memory 130 may be implemented in the form of a memory embedded in the robot 100 according to a data storage use, or in the form of a memory attachable to or detachable from the robot 100. For example, the data for the driving of the robot 100 may be stored in the memory embedded in the robot 100, and data for an expansion function of the robot 100 may be stored in a memory attachable to or detachable from the robot 100.

The memory embedded in the robot 100 may be implemented as at least one from among a volatile memory (e.g., a dynamic random access memory (DRAM), a static RAM (SRAM), a synchronous dynamic RAM (SDRAM) etc.), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). The memory attachable to or detachable from the robot 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., universal serial bus (USB) memory) connectable to a USB port.

In the memory 130, information mapped with at least one sensor that receives transmitted signal and a sensor that transmits the signal after the signal is received through the at least one sensor may be stored for each of the sensors operating in the signal transmitting mode.

Here, the signal transmitting mode may refer to a mode of transmitting a signal for detecting an object from among the plurality of sensors. A sensor operating in the signal transmitting mode may transmit a signal while operating mode is a signal mode, and other than the time operating in the signal transmitting mode (i.e., time period of transmitting the signal), the sensor may receive signals by operating in a signal receiving mode. Only one sensor from among the plurality of sensors 120 included in the robot 100 may operate in the signal transmitting mode. For example, any one sensor from among the plurality of sensors 120 may operate, based on a control signal for any one sensor to operate in the signal transmitting mode being received from the at least one processor 140, in the signal transmitting mode based on the received signal. The any one sensor operating in the signal transmitting mode may transmit a signal during the pre-set time period.

The plurality of sensors 120 included in the robot 100 may operate in the signal receiving mode. For example, the any one sensor from among the plurality of sensors 120 may operate, based on a control signal for any one sensor to operate in the signal receiving mode being received from the at least one processor 140, in the signal receiving mode based on the received signal. The any one sensor operating in the signal receiving mode may receive a signal during the pre-set time period.

A first sensor from among the plurality of sensors 120 operating in the signal transmitting mode may be assumed. If the first sensor transmits a signal, the at least one sensor from among the plurality of sensors 120 may receive the signal. In this case, the received signal may be a signal reflected from an object. If a signal is received through the at least one sensor, a sensor operating in the signal transmitting mode may be identified after the first sensor. That is, the sensor transmitting the signal by operating in the signal transmitting mode after the first sensor may be identified based on whether the signal received from the first sensor is received as any signal from among the plurality of sensors, and information for identifying the above-described sensor by the at least one processor 140 may be stored in the memory 130. The above will be described in detail through FIG. 4.

The at least one processor 140 (hereinafter, referred to as a processor) may control the overall operation of the robot 100 by being electrically connected with the driver 110, the plurality of sensors 120, and the memory 130. The processor 140 may be formed of one or a plurality of processors. Specifically, the processor 140 may perform an operation of the robot 100 by executing at least one instruction stored in the memory (not shown).

The processor 140 may be implemented as a digital signal processor (DSP) for processing a digital image signal, a microprocessor, a graphics processing unit (GPU), an artificial intelligence (AI) processor, a neural processing unit (NPU), or a time controller (TCON). However, the embodiment is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 140 may be implemented as a System on Chip (SoC) or a large scale integration (LSI) in which a processing algorithm is embedded, and may be implemented in the form of an application specific integrated circuit (ASIC) or a field programmable gate array (FPGA).

The processor 140 may transmit a first signal for identifying a presence or absence of an object within a sensing area of the plurality of sensors 120. The sensing area of the plurality of sensors 120 may refer to an area in which the processor 140 is able to identify an object through a signal transmitted and received through the plurality of sensors 120, and a size of the sensing area may vary according to a type of the sensor implemented. The processor 140 may identify whether an object is present within a pre-set distance from the robot 100 through the signal received through the plurality of sensors 120.

The processor 140 may transmit the first signal for identifying the presence or absence of the object within the sensing area of the plurality of sensors 120 through the A sensor operating in the signal transmitting mode from among the plurality of sensors 120 during the first time period. Here, any one sensor (e.g., A sensor) only from among the plurality of sensors 120 included in the robot may operate in the signal transmitting mode, and the any one sensor operating in the signal transmitting mode may transmit a signal.

Each of the sensors 120 included in the robot 100 may operate in any one mode from among the signal transmitting mode or the signal receiving mode. While the any one sensor from among the plurality of sensors 120 included in the robot 100 operates in the signal transmitting mode, remaining sensors from among the plurality of sensors 120 may operate in the signal receiving mode.

The plurality of sensors 120 may be implemented as a transmitting and receiving integrated sensor in which a transmitting device and a receiving device are implemented as an integrated type, that is, a transceiver device. In this case, the processor 140 may transmit a first control signal for operating a sensor in the signal transmitting mode to any one sensor from among the plurality of sensors 120, and transmit a second control signal for operating a sensor in the signal receiving mode to the remaining sensors from among the plurality of sensors 120. For example, a circuit included in the plurality of sensors 120 may be driven to perform a signal transmitting function according to the first control signal, and driven to perform a signal receiving function according to the second control signal.

For example, the processor 140 may transmit a control signal for operating in the signal transmitting mode during a pre-set first time period (e.g., 10 ms) to the A sensor from among the plurality of sensors 120, and transmit a control signal for operating in the signal receiving mode during the pre-set first time period to the remaining sensors from among the plurality of sensors 120. Accordingly, any one sensor may operate in the signal transmitting mode, and the remaining sensors may operate in the signal receiving mode.

Then, the processor 140 may control the plurality of sensors 120 for each of the sensors 120 to operate in the signal receiving mode during the second time period after the first time period. Each of the sensors 120 may operate in the signal receiving mode during the second time period after the first time period, and the at least one sensor from among the plurality of sensors 120 may receive a reflected first signal (or, a first reflection signal) during the second time period.

Then, the processor 140 may identify a second sensor to operate in the signal transmitting mode during a third time period after the second time period. For example, the processor 140 may identify the second sensor to operate in the signal transmitting mode during the third time period by using information about the at least one sensor that received the reflected first signal (or, first reflection signal) during the second time period after the first time period from among the plurality of sensors 120 and information stored in the memory 130.

Then, the processor 140 may transmit a control signal for the identified second sensor to operate in the signal transmitting mode during the third time period to the second sensor, and transmit a control signal for the remaining sensors excluding the identified second sensor from among the plurality of sensors to operate in the signal receiving mode to the remaining sensors.

According to another example, the plurality of sensors 120 may be implemented as separate sensors in which the transmitting device and the receiving device are included separately.

In this case, the processor 140 may control the transmitting device included in the any one sensor which is to operate in the signal transmitting mode from among the plurality of sensors 120 to operate and operate the corresponding sensor in the signal transmitting mode. In addition, the processor 140 may control the receiving device included in the remaining sensors from among the plurality of sensors 120 to operate and operate the corresponding sensors in the signal receiving mode. For example, the processor 140 may apply power to the transmitting device included in the any one sensor to operate in the signal transmitting mode from among the plurality of sensors 120 and not apply power to the receiving device, and operate the corresponding sensor in the signal transmitting mode. In addition, the processor 140 may apply power to the receiving device included in the remaining sensors which are to operate in the signal receiving mode from among the plurality of sensors 120 and not apply power to the transmitting device, and operate the corresponding sensors in the signal receiving mode. That is, in the case of the sensor operating in the signal transmitting mode from among the plurality of sensors 120, the transmitting device may be turned-on and the receiving device may be turned-off, and in the case of the sensors operating in the signal receiving mode, the transmitting device may be turned-off and the receiving device may be turned-on.

In the above, the plurality of sensors 120 being implemented as an integrated sensor as a whole or as separate sensors have been assumed, but a portion from among the plurality of sensors 120 may be implemented as an integrated sensor and the remaining may be implemented as separate sensors.

The processor 140 may identify the second sensor to transmit a signal during the third time period after the first time period.

The processor 140 may identify whether the first signal is reflected from an object and received in at least one sensor from among the plurality of sensors 120 during the second time period after the first time period. Then, when the first signal is received in the at least one sensor, the processor 140 may identify the B sensor to transmit the signal during the third time period after the first time period from among the plurality of sensors 120 based on information stored in the memory 130 and the at least one sensor to which the first reflection signal corresponding to the first signal is received. Here, the first reflection signal may refer to a signal obtained by the first signal being reflected by the object.

That is, the processor 140 may identify the second sensor by using information mapped with at least one sensor that receives the transmitted signal and a sensor that transmits the signal after the signal is received through the at least one sensor for each of the sensors operating in the signal transmitting mode which are stored in the memory 130. For example, the processor 140 may be configured to identify, from among the plurality of sensors 120, the B sensor and the C sensor which receive the first reflection signal corresponding to the first signal. The processor 140 may be configured to identify a sensor to operate in the signal transmitting mode after the first sensor using the information mapped with the sensor that transmits the signal after the signal is received through the at least one sensor stored in the memory 130. The above will be described in detail through FIG. 4.

The processor 140 may transmit a second signal by operating the identified second sensor in the signal transmitting mode. The processor 140 may transmit the second signal using the identified second sensor during the third time period after the first time period. Here, the first signal may refer to a signal that is transmitted through the any one sensor from among the plurality of sensors 120 during the first time period, and the second signal may refer to a signal that is transmitted through the any one sensor from among the plurality of sensors 120 during the third time period after the first time period.

The processor 140 may identify a location of an object based on whether a second reflection signal corresponding to the second signal is received at the second sensor. Here, the second reflection signal may refer to a signal obtained by the second signal being reflected by an object. The processor 140 may identify whether the second signal transmitted during the third time period through the B sensor from among the plurality of sensors 120 is reflected and received at the B sensor, and identify the location of the object based on whether the second signal is received at the B sensor. The above will be described in detail through FIG. 5A to FIG. 5C.

The processor 140 may control, based on a location of an object being identified, the driver 110 to travel avoiding the object based on the identified location of the object.

Figure 3:
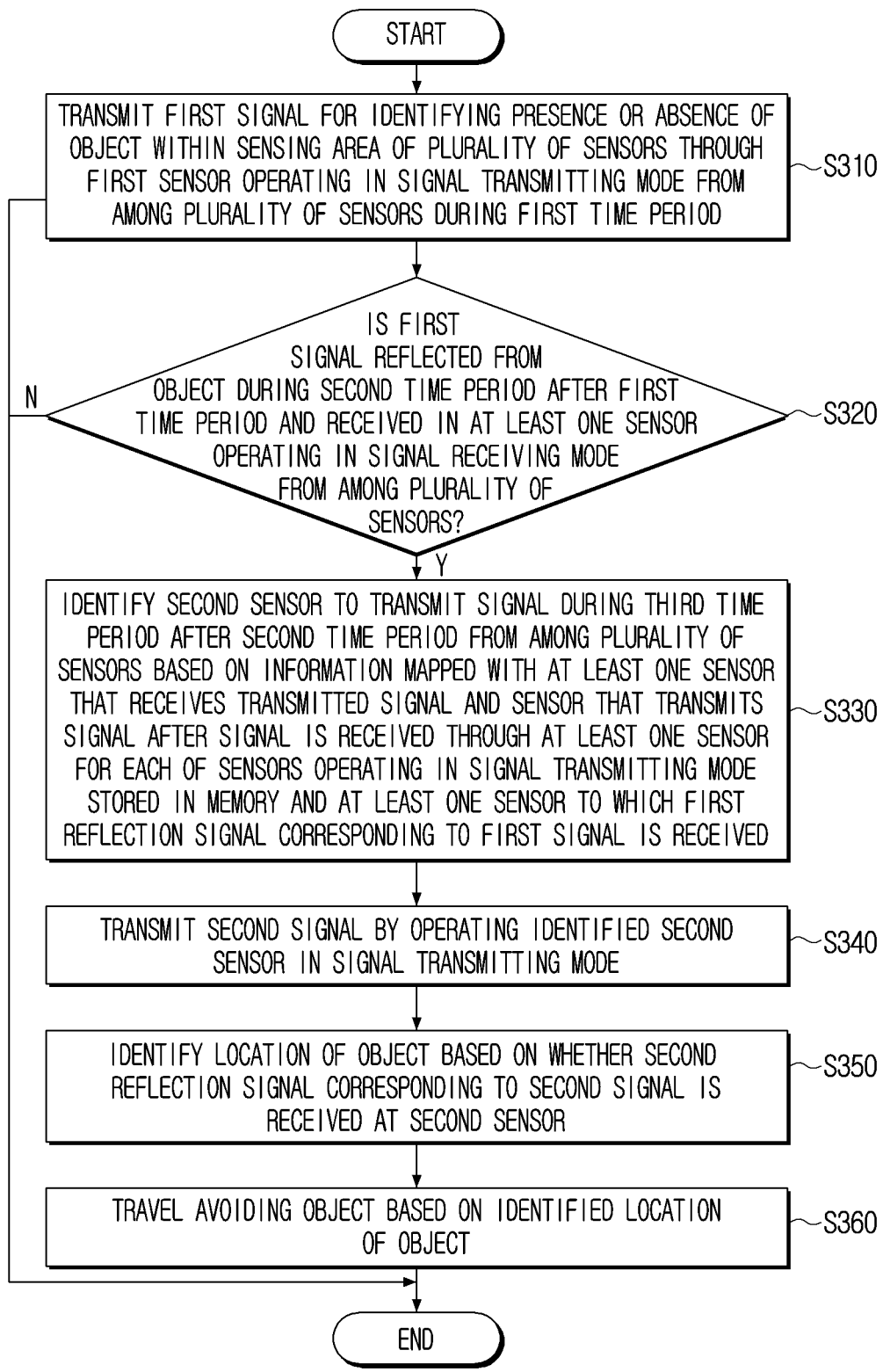
FIG. 3 is a flowchart and diagram illustrating a control method of a robot according to one or more embodiments.

FIG. 3 is a flowchart and diagram illustrating a control method of a robot according to one or more embodiments.

First, referring to FIG. 3, a control method may include transmitting the first signal for identifying the presence or absence of an object within the sensing area of the first sensor through the first sensor operating in the signal transmitting mode from among the plurality of sensors 120 during the first time period (S310). The processor 140 may transmit, based on the A sensor from among the plurality of sensors 120 included in the robot 100 operating in the signal transmitting mode, the first signal through the A sensor operating in the signal transmitting mode. In this case, the remaining sensors excluding the A sensor from among the plurality of sensors 120 may operate in the signal receiving mode. If the plurality of sensors are implemented as an ultrasonic sensor, the first signal may be an ultrasonic signal. The processor 140 may transmit the first signal to measure a distance between the robot 100 and an object through the A sensor.

Then, the control method may include identifying whether the first signal is reflected from the object during the second time period after the first time period and received in the at least one sensor operating in the signal receiving mode from among the plurality of sensors 120 (S320). A size of the first time period may be 10 milliseconds (ms), and a size of the second time period may be 25 ms, but are not limited thereto. The plurality of sensors 120 may operate in the signal receiving mode during the second time period.

Then, the control method may include identifying, based on the reflected first signal (or, first reflection signal) being received at the at least one sensor from among the plurality of sensors 120 (S320: Y), the second sensor to transmit a signal during the third time period after the second time period from among the plurality of sensors 120 based on information mapped with the at least one sensor that receives the transmitted signal and the sensor that transmits the signal after the signal is received through the at least one sensor for each of the sensors operating in the signal transmitting mode stored in the memory 130 and the at least one sensor to which the first reflection signal corresponding to the first signal is received (S330).

If the first reflection signal is received at the D sensor from among the plurality of sensors 120 during the second time period after the first signal is transmitted during the first time period through the A sensor, the processor 140 may identify the D sensor as the second sensor to transmit the signal during the third time period after the first signal is transmitted during the first time period based on the information stored in the memory 130.

Then, the control method may include transmitting the second signal by operating the identified second sensor in the signal transmitting mode (S340). In this case, the second signal transmitted from the second sensor may be a signal of a same type as with the first signal. For example, if the first sensor and the second sensor are respectively implemented as an ultrasonic sensor, the first signal and the second signal may be ultrasonic signals.

Then, the control method may include identifying a location of an object based on whether the second reflection signal corresponding to the second signal is received at the second sensor (S350). The processor 140 may identify, based on the second reflection signal being received at the D sensor, as an object being present in a pre-set first location. Alternatively, the processor 140 may identify, based on the second reflection signal not being received during the pre-set time at the D sensor, as the object being present in a pre-set second location.

Then, the control method may include traveling avoiding the object based on the identified location of the object (S360). The processor 140 may control, based on the location of the object being identified based on whether the second reflection signal is received at the D sensor, the driver 110 to travel avoiding the identified object.

According to the above-described example, the robot 100 may identify the sensor operating in the signal transmitting mode during a plurality of pre-set time periods (i.e., an order of the sensor operating in the signal transmitting mode) based on the information stored in the memory 130, and accurately and quickly identify the location of the object by transmitting a signal using the identified sensor. Accordingly, user satisfaction may increase as performance of the robot 100 is improved.

FIG. 4 is a diagram illustrating a method of identifying a second sensor using information stored in a memory according to one or more embodiments.

Referring to FIG. 4, in the memory 130, information 400 mapped with at least one sensor 410 that receives the transmitted signal and a sensor 430 that transmit a signal after the signal is received through the at least one sensor may be stored for each of the sensors 410 operating in the signal transmitting mode. The plurality of sensors 120 including the A sensor, the B sensor, the C sensor, and the D sensor may be provided in the robot 100.

The A sensor from among the plurality of sensors 120 transmitting the first signal during the first time period may be assumed. When the first signal transmitted from the A sensor is reflected by an object and received at the D sensor from among the plurality of sensors 120, the processor 140 may identify the sensor to transmit the second signal after the first signal is received as the D sensor based on the information 400 stored in the memory 130 (first table, or No. 1).

Alternatively, the B sensor from among the plurality of sensors 120 transmitting the first signal during the first time period may be assumed. When the first signal transmitted from the B sensor is reflected by an object and received at the D sensor from among the plurality of sensors 120, the processor 140 may identify the sensor to transmit the second signal after the first signal is received as the C sensor based on the information 400 stored in the memory 130 (fifth table, or No. 5).

However, the above is merely one embodiment, and although only a first table to a sixth table (or, No. 1 to No. 6) are shown in FIG. 4, a plurality of tables including the first table to the sixth table may be stored in the memory 130. Sensors parenthesized (e.g., (A) sensor) in a signal receiving sensor 420 shown in FIG. 4 may mean that the configuration that is not necessarily essential. For example, if the A sensor transmits the first signal, not only when the signal receiving sensor is the D sensor, but also when the signal receiving sensor is the D sensor and the A sensor may correspond to the first table. That is, in order to correspond to the first table, the D sensor needs to be included in the signal receiving sensor, but the A sensor may not be necessarily included.

According to an example, such as is seen in FIG. 4, Etc may be 'et cetera,' that is, referring to a case of the signal receiving sensor other than the first table to the third table when the A sensor is a sensor in the signal transmitting mode. For example, if only the A sensor corresponds to the signal receiving sensor, the processor 140 may identify the B sensor which is the signal transmitting sensor 430 corresponding to a fourth table from among the plurality of tables (first table to sixth table).

According to the example described above, the robot 100 may identify, based on a signal transmitted during the first time period being received, the sensor that received the signal, and identify a sensor to operate in the signal transmitting mode during the third time period based therefrom. Accordingly, a sensor to operate in a signal operating mode may not necessarily be in a pre-set order, and the robot 100 may improve a detection speed of an object.

Figure 5A:
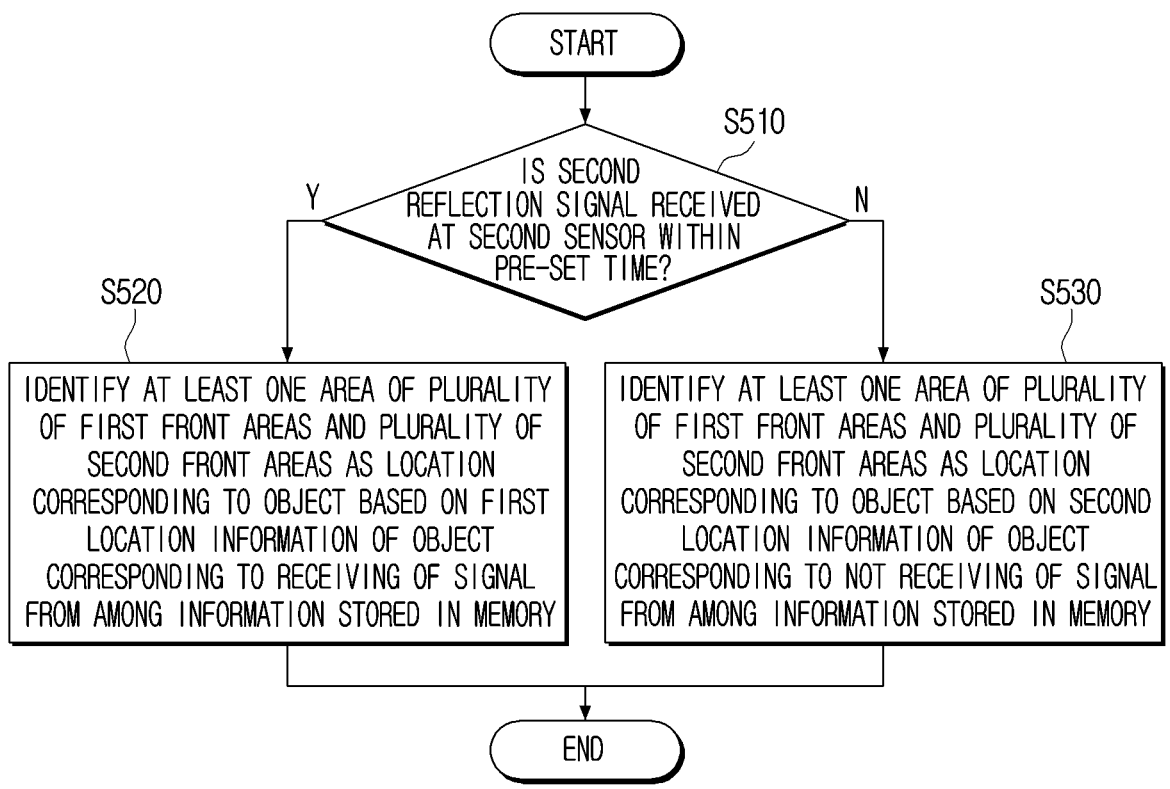
Figure 5C:
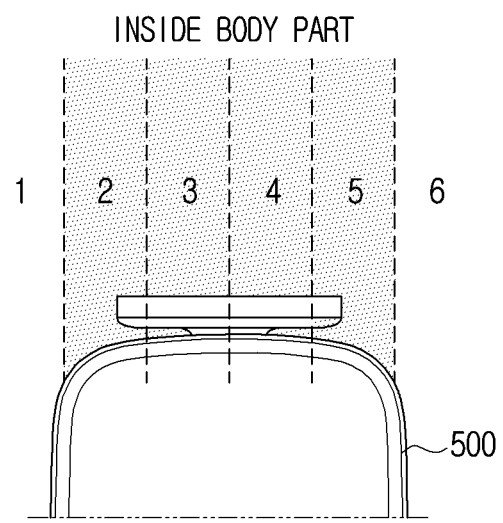

FIG. 5A to FIG. 5C are diagrams illustrating a method of identifying a location of an object based on whether a second reflection signal is received at a second sensor according to one or more embodiments.

First, referring to FIG. 5A, a control method may include identifying whether the second reflection signal is received at the second sensor within a pre-set time (S510). The processor 140 may identify, based on the second signal being transmitted through the second sensor, whether the second reflection signal, in which the second signal is reflected by an object, is received at the second sensor within a pre-set time.

Then, the control method may include identifying, based on the second reflection signal being received at the second sensor within the pre-set time (S510: Y), at least one area of a plurality of first front areas and a plurality of second front areas as a location corresponding to the object based on first location information of the object corresponding to receiving of the signal from among the information stored in the memory 130 (S520). The above will be described in detail through FIG. 5B and FIG. 5C.

Referring to FIG. 5B, information 510 stored in the memory 130 may further include location information 512 and 513 of an object according to whether a sensor receives a reflection signal corresponding to a signal transmitted by a sensor 511 that transmits the signal after the signal is received.

Here, the location information 512 and 513 of the object may be information about a relative location of the object on a travel path. The location information 512 and 513 of the object may mean, based on the travel path of the robot 100 being divided into a pre-set plurality of front areas, an area at which the object is located from among the plurality of front areas. The location information of the object may include information of different values corresponding to whether a reflection signal is received within the pre-set time from a signal transmitting sensor 511 after the signal is received.

For example, the first signal being transmitted through the A sensor, and the reflected first signal being received through the D sensor as in the case of the first table (or, No. 1) may be assumed. The processor 140 may identify the D sensor from among the plurality of sensors 120 based on information stored in the memory 130, and transmit the second signal through the D sensor. Then, if the second reflection signal reflected by an object is not received at the D sensor within the pre-set time, the processor 140 may identify that the location of the object is a first area based on location information 512 corresponding to not receiving of the reflection signal stored in the memory 130. Alternatively, if the second reflection signal reflected by an object is received at the D sensor within the pre-set time, the processor 140 may identify that the location of the object is a fourth area and a fifth area based on location information 513 corresponding to receiving of the reflection signal stored in the memory 130. In this case, the location of the object may be an area that includes the fourth area and the fifth area, but may be an area that includes the fourth area, the fifth area, and the sixth area. That is, the meaning of (6) area included in the parenthesis may mean that the sixth area is not an area that is essentially included (i.e., a "don't care" area). The first area to the sixth area will be described in detail through FIG. 5C below.

Referring to FIG. 5C, the location information 512 and 513 of the object stored in the memory 130 may include location information about the plurality of first front areas corresponding to a body part of a robot and location information about at least one from among the plurality of second front areas corresponding to an outside of the body part of the robot. A travel path of a robot 500 may be identified into a plurality of front areas, and the plurality of first front areas corresponding to the body part of the robot may include a second area to a fifth area shown in FIG. 5C. In addition, the plurality of second front areas corresponding to the outside of the body part of the robot may be an area that includes the first area and the sixth area.

The plurality of first front areas may refer to an area in which a front area of the body part of the robot is divided into pre-set widths (or, breadth), and a for a pre-set width may be pre-stored in the memory 130. In this case, if the plurality of sensors 120 are implemented as four sensors, a sensor corresponding to each of the first front areas may be provided. The plurality of second front areas may include the first area corresponding to a relatively left side from among the outside of the body part of the robot 500 and the sixth area corresponding to a relatively right side from among the outside of the body part of the robot 500. That is, the first area may refer to an area corresponding to a relatively left side based on the travel direction of the robot 500 from among the front area excluding the plurality of first front areas, and the sixth area may refer an area corresponding to a relatively right side based on the travel direction of the robot 500 from among the front area excluding the plurality of first front areas.

Referring back to FIG. 5B, the processor 140 may identify the location of the object based on whether the second reflection signal is received at the second sensor and information 510 stored in the memory 130. For example, the first signal being transmitted through the A sensor, and the reflected first signal being received through the D sensor may be assumed. The processor 140 may identify the D sensor from among the plurality of sensors 120 based on the information stored in the memory 130, and transmit the second signal through the D sensor. Then, if the second reflection signal reflected by an object is received at the D sensor within the pre-set time, the processor 140 may identify that the location of the object is the first area based on the location information 512 corresponding to receiving of the second reflection signal stored in the memory 130. Alternatively, if the second reflection signal reflected by an object is not received at the D sensor within the pre-set time, the processor 140 may identify that the location of the object is the fourth area and the fifth area based on the location information 513 corresponding to not receiving of the second reflection signal stored in the memory 130. In this case, the location of the object may be an area including the fourth area and the fifth area, but may be an area including the fourth area, the fifth area, and the sixth area.

Referring back to FIG. 5A, the control method may include identifying, based on the second reflection signal not being received at the second sensor within the pre-set time (S510: N), at least one area of the plurality of first front areas and the plurality of second front areas as the location corresponding to the object based on second location information of the object corresponding to not receiving of the signal from among the information stored in the memory 130 (S530).

The first signal being transmitted through the A sensor, and the reflected first signal being received through the B sensor and the D sensor may be assumed. The processor 140 may identify the D sensor from among the plurality of sensors 120 based on information stored in the memory 130, and transmit the second signal through the D sensor. Then, if the second reflection signal reflected by an object is not received at the D sensor within the pre-set time, the processor 140 may identify that the location of the object is the fourth area and the fifth area based on the location information 513 corresponding to not receiving of the second reflection signal stored in the memory 130. In this case, the location of the object may be an area including the fourth area and the fifth area, but is not limited thereto, and may be an area additionally including at least one area from among a third area or the sixth area together with the fourth area and the fifth area.

Figure 6:
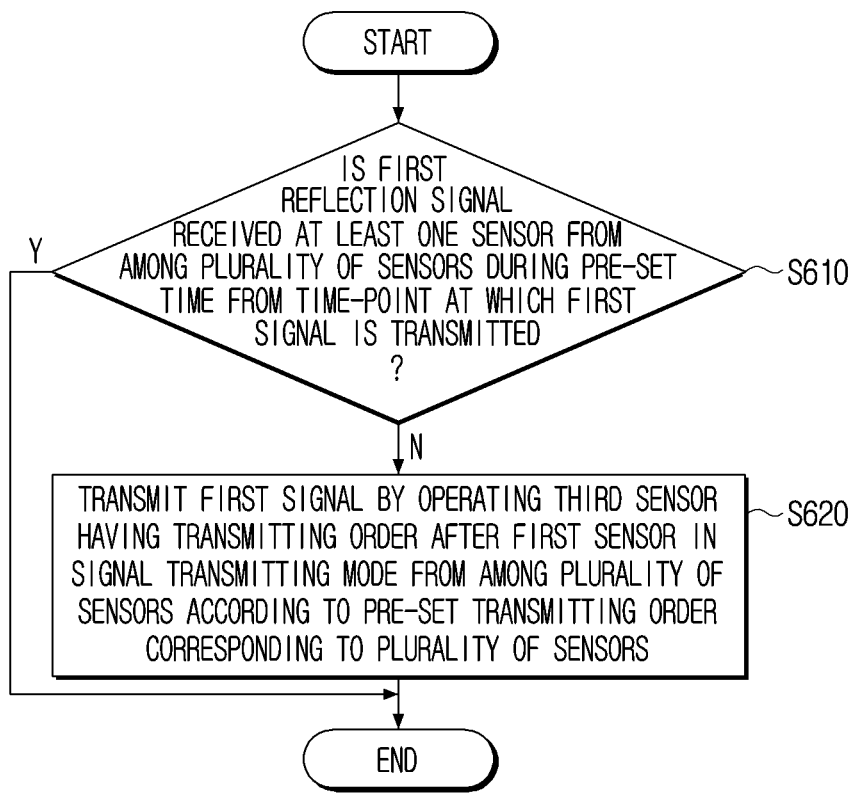
FIG. 6 is a diagram illustrating an example of when a first reflection signal is not received according to one or more embodiments.

FIG. 6 is a diagram illustrating an example of when a first reflection signal is not received according to one or more embodiments.

Referring to FIG. 6, the control method may include identifying whether the first reflection signal is received in at least one sensor from among the plurality of sensors 120 during the pre-set time from a time-point at which the first signal is transmitted (S610). The processor 140 may identify, based on the first signal being transmitted from the A sensor from among the plurality of sensors 120, whether the first reflection signal is received in at least one from among the plurality of sensors 120 including the A sensor during the pre-set time from a time-point at which the first signal is received.

Then, the control method may include transmitting, based on the first reflection signal not being received (S610: N), the first signal by operating the third sensor having the transmitting order after the first sensor from among the plurality of sensors in the signal transmitting mode according to a pre-set transmitting order corresponding to the plurality of sensors. Here, the pre-set transmitting order may refer to an order of a sensor to transmit the first signal. For example, if the plurality of sensors 120 are implemented as four sensors including the A sensor to the D sensor, the pre-set transmitting order may be (A-B-C-D). In this case, the pre-set transmitting order may be an arrangement order of the plurality of sensors 120. That is, when the A sensor to the D sensor are arranged in order based on the left side of the robot 100, the pre-set transmitting order may be an order arranged based on the left side of the robot 100.

The processor 140 may transmit, based on the first reflection signal not being received from any one sensor from among the plurality of sensors 120 including the A sensor during the pre-set time after the first signal is transmitted from the A sensor, the first signal through the B sensor according to the pre-set transmitting order.

Figure 7:
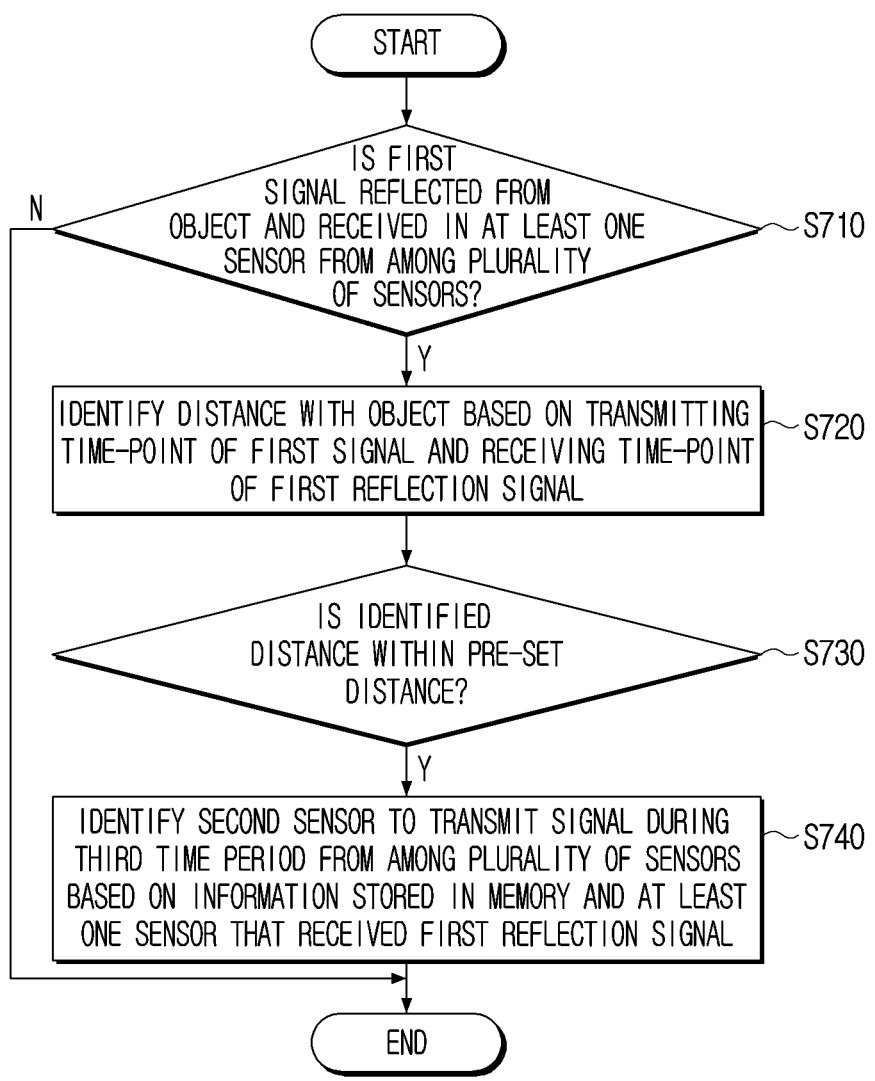
FIG. 7 is a diagram illustrating a method of identifying a second sensor based on a distance with an object according to one or more embodiments.

FIG. 7 is a diagram illustrating a method of identifying a second sensor based on a distance with an object according to one or more embodiments.

Referring to FIG. 7, the control method may include identifying whether the first signal is first reflected from the object and received in at least one sensor from among the plurality of sensors 120 (S710).

Then, the control method may include identifying, based on the first signal being reflected from the object and received in at least one sensor from among the plurality of sensors (S710: Y), a transmitting time-point of the first signal and a distance with the object based on a receiving time-point of the first reflection signal (S720). The processor 140 may identify, based on the first signal transmitted through the first sensor being reflected from the object and received at the second sensor from among the plurality of sensors 120, a distance between the robot 100 and the object using the size of the time period corresponding to the transmitting time-point of the first signal and the receiving time-point of the first signal and a speed of the signal that is transmitted through the first sensor.

Then, the control method may include identifying whether the identified distance is within a pre-set distance (S730). Information about the pre-set distance may be pre-stored in the memory 130, and the processor 140 may identify whether the identified distance is within the pre-set distance based on the information stored in the memory 130.

Then, the control method may include identifying, based on the identified distance being within the pre-set distance (S730: Y), the second sensor to transmit a signal during the third time period from among the plurality of sensors based on information stored in the memory 130 and at least one sensor that received the first reflection signal (S740).

According to the above-described example, the robot 100 may be able to transmit the second signal through the second sensor only when the distance between the object and the robot 100 is less than the pre-set distance. Accordingly, an efficient operation performance of the robot 100 may be possible.

FIG. 8A to FIG. 8E are diagrams illustrating a method of identifying a location of an object according to one or more embodiments.

Figure 8A:
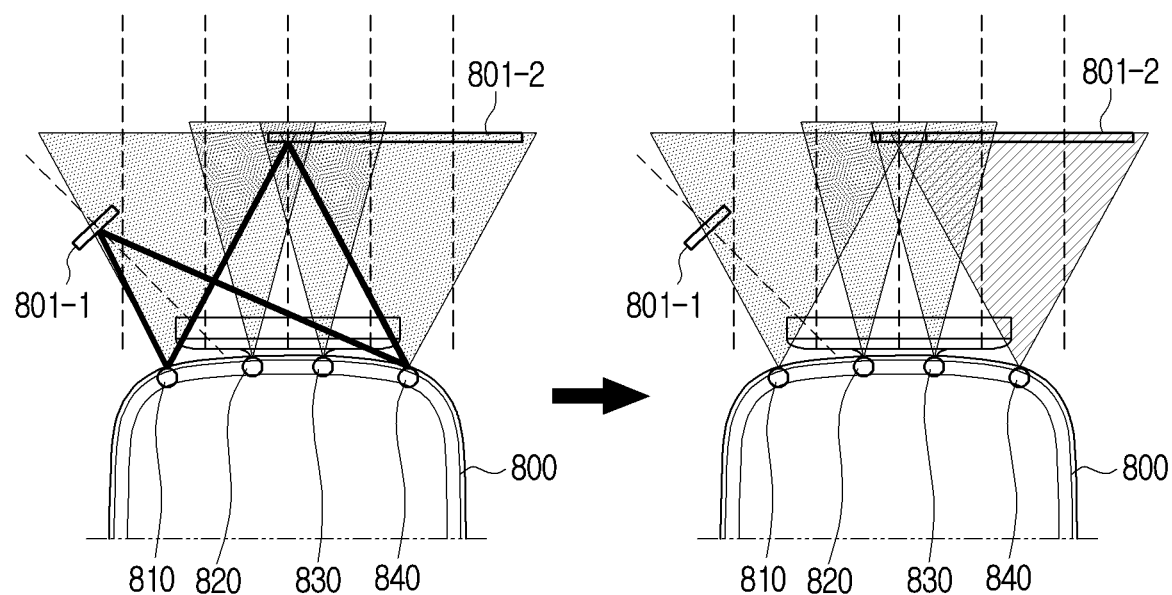
FIG. 8A to FIG. 8E are diagrams illustrating a method of identifying a location of an object according to one or more embodiments.

As shown in FIG. 8A, an object being present at a first location 801-1 or a second location 801-2 from among a travel path of a robot 800 may be assumed. Referring to FIG. 5B and FIG. 5C, the front area of the robot 100 may be identified into a plurality of areas (the first area to the sixth area). In this case, the object present in the first location 801-1 may be included in the first area, and the object present in the second location 801-2 may be included in the fourth area to the sixth area. As shown in FIG. 8A, a portion of the object present in the second location 801-2 may be included in the third area, but if the object is included in the third area by less than a pre-set ratio, the object may be treated as not being included in the third area. The processor 140 may first transmit the first signal during the first time period through an A sensor 810 from among a plurality of sensors 810 to 840 based on a pre-set transmitting order. In this case, the first signal reflected from the object present in the first location 801-1 or the second location 801-2 may be received at a D sensor 840. Alternatively, the reflected first signal may be received at the D sensor 840 and the A sensor 810.

The processor 140 may identify, based on the reflected first signal being received at the D sensor 840, a sensor to transmit the second signal during the third time period after the first signal is received as the D sensor 840 based on information mapped with at least one sensor that receives the transmitted signal and a sensor that transmits a signal after the signal is received through the at least one sensor as information stored in the memory 130. Because the information stored in the memory 130 has been described through FIG. 5B, detailed descriptions thereof will be omitted.

The processor 140 may transmit, based on the sensor to transmit the second signal during the third time period being identified as the D sensor 840, the second signal through the identified D sensor 840. In this case, the processor 140 may identify whether the location of the object is the first location 801-1 or the second location 801-2 based on whether the second signal transmitted through the D sensor 840 is received through the D sensor 840.

The second signal transmitted through the D sensor 840 not being reflected by an object due to the object being present in the first location 801-1 may be assumed. The processor 140 may identify, based on the second reflection signal not being received at the D sensor 840 within the pre-set time, the first area from among the plurality of front areas (the first area, the second area, the third area, the fourth area, the fifth area, and the sixth area) corresponding to the robot 800 as the location information of the object based on the location information of the object corresponding to not receiving of the reflection signal from among the information stored in the memory 130. Then, the processor 140 may control the driver 110 to travel avoiding the first area based on the identified location information of the object.

The second signal transmitted through the D sensor 840 being reflected by an object due to the object being present in the second location 801-2 may be assumed. The processor 140 may identify, based on the second reflection signal being received at the D sensor 840 within the pre-set time, the fourth area and the fifth area from among the plurality of front areas (the first area, the second area, the third area, the fourth area, the fifth area, and the sixth area) corresponding to the robot 800 as the location information of the object based on the location of the object corresponding to receiving of the reflection signal from among the information stored in the memory 130. In this case, the fourth area, the fifth area, and the sixth area may be identified as the location information of the object. Then, the processor 140 may control the driver 110 to travel avoiding the fourth area and the fifth area based on the identified location information of the object. Alternatively, the processor 140 may control the driver 110 to travel avoiding the fourth area, the fifth area, and the sixth area.

That is, according to the above-described example, because the reflected first signal can be received at the D sensor 840 which is the same sensor for each of the first location 801-1 or the second location 801-2 shown in FIG. 8A, the robot 800 may transmit the second signal through the D sensor 840, and identify an accurate location of the object based on whether the reflected second signal is received through the D sensor 840 again. Accordingly, the robot 800 may be able to reduce an object detection time, and a collision likelihood with the object may be significantly lowered.

Figure 8B:
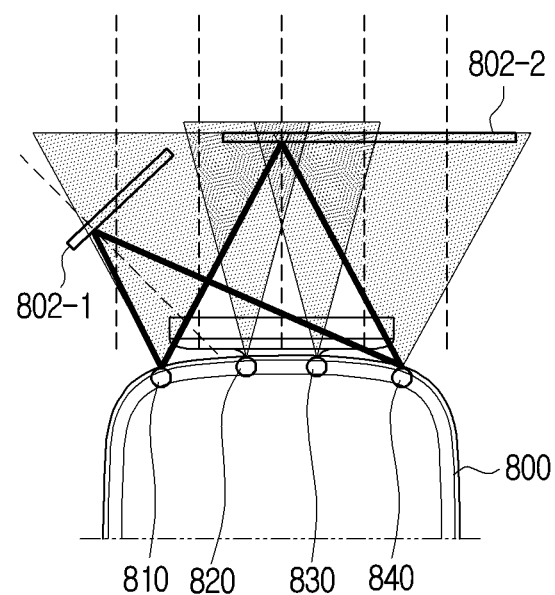

As shown in FIG. 8B, according to one or more embodiments, an object being present in a first location 802-1 or a second location 802-2 from among the travel path of the robot 800 may be assumed. The object present in the first location 802-1 may be included in the first area and the second area, and the object present in the second location 802-2 may be included in the second area to the sixth area. The processor 140 may first transmit the first signal during the first time period through the A sensor 810 from among the plurality of sensors 810 to 840 based on a pre-set transmitting order. In this case, the first signal reflected from the object present in the first location 802-1 or the second location 802-2 may be received at a B sensor 820 and the D sensor 840.

The processor 140 may identify, based on the reflected first signal being received at the B sensor 820 and the D sensor 840, the sensor to transmit the second signal during the third time period after the first signal is received as the D sensor 840 based on information mapped with at least one sensor that receives the transmitted signal and a sensor that transmits a signal after the signal is received through the at least one sensor as information stored in the memory 130.

The processor 140 may transmit, based on the sensor to transmit the second signal during the third time period being identified as the D sensor 840, the second signal through the identified D sensor 840. In this case, the processor 140 may identify whether the location of the object is the first location 802-1 or the second location 802-2 based on whether the second signal transmitted through the D sensor 840 is received through the D sensor 840.

The second signal transmitted through the D sensor 840 not being reflected by an object due to the object being present in the first location 802-1 may be assumed. The processor 140 may identify, based on the second reflection signal not being received at the D sensor 840 within the pre-set time, the first area and the second area from among the plurality of front areas (the first area, the second area, the third area, the fourth area, the fifth area, and the sixth area) corresponding to the robot 800 as the location information of the object based on the location information of the object corresponding to not receiving of the reflection signal from among the information stored in the memory 130. Then, the processor 140 may control the driver 110 to travel avoiding the first area and the second area based on the identified location information of the object.

The second signal transmitted through the D sensor 840 being reflected by an object due to the object being present in the second location 802-2 may be assumed. The processor 140 may identify, based on the second reflection signal being received at the D sensor 840 within the pre-set time, the fourth area and the fifth area from among the plurality of front areas (the first area, the second area, the third area, the fourth area, the fifth area, and the sixth area) corresponding to the robot 800 as the location information of the object based on the location information of the object corresponding to receiving of the reflection signal from among the information stored in the memory 130. In this case, the fourth area, the fifth area, and the sixth area being identified as the location information of the object may be included, and the third area, the fourth area, and the fifth area being identified as the location information of the object may be included. Alternatively, the third area, the fourth area, the fifth area, and the sixth area being identified as the location information of the object may be included. Then, the processor 140 may control the driver 110 to travel avoiding the fourth area and the fifth area based on the identified location information of the object. Alternatively, the processor 140 may control the driver to travel avoiding the area included with at least one area from among the third area or the sixth area together with the fourth area and the fifth area.

Figure 8C:
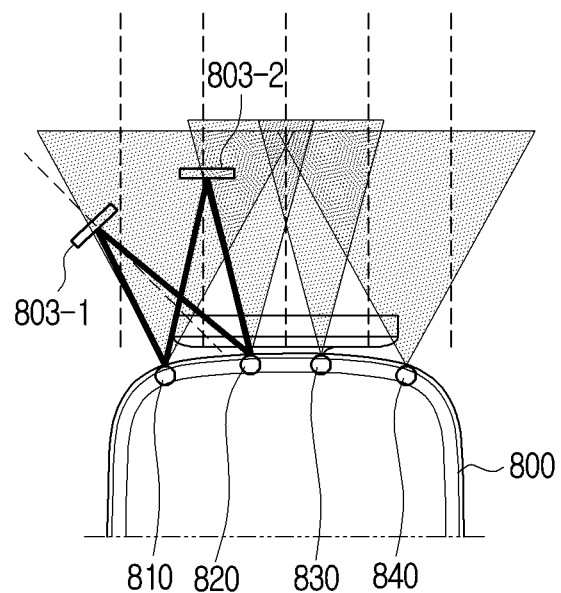

As shown in FIG. 8C, an object being present in a first location 803-1 or a second location 803-2 from among the travel path of the robot 800 may be assumed. The object present in the first location 803-1 may be included in the first area, and the object present in the second location 803-2 may be included in the second area to the third area. The processor 140 may first transmit the first signal during the first time period through the A sensor 810 from among the plurality of sensors 810 to 840 based on a pre-set transmitting order. In this case, the first signal reflected from an object present in the first location 803-1 or the second location 803-2 may be received at the A sensor 810 and the B sensor 820.

The processor 140 may identify, based on the reflected first signal being received at the A sensor 810 and the B sensor 820, the sensor to transmit the second signal during the third time period after the first signal is received as the B sensor 820 based on information mapped with at least one sensor that receives the transmitted signal and a sensor that transmits a signal after the signal is received through the at least one sensor as information stored in the memory 130.

The processor 140 may transmit, based on the sensor to transmit the second signal during the third time period being identified as the B sensor 820, the second signal through the identified B sensor 820. In this case, the processor 140 may identify whether the location of the object is the first location 803-1 or the second location 803-2 based on whether the second signal transmitted through the B sensor 820 is received through the B sensor 820.

The second signal transmitted through the B sensor 820 not being reflected by an object due to the object being present in the first location 803-1 may be assumed. The processor 140 may identify, based on the second reflection signal not being received at the B sensor 820 within the pre-set time, the first area from among the plurality of front areas (the first area, the second area, the third area, the fourth area, the fifth area, and the sixth area) corresponding to the robot 800 as the location information of the object based on the location information of the object corresponding to not receiving of the reflection signal from among the information stored in the memory 130. In this case, the first area and the second area may be identified as the location information of the object. Then, the processor 140 may control the driver 110 to travel avoiding the first area based on the identified location information of the object. Alternatively, the processor 140 may control the driver 110 to travel avoiding the first area and the second area based on the identified location information of the object.

The second signal transmitted through the B sensor 820 being reflected by an object due to the object being present in the second location 803-2 may be assumed. The processor 140 may identify, based on the second reflection signal being received at the B sensor 820 within the pre-set time, the third area from among the plurality of front areas (the first area, the second area, the third area, the fourth area, the fifth area, and the sixth area) corresponding to the robot 800 as the location information of the object based on the location information of the object corresponding to receiving of the reflection signal from among the information stored in the memory 130. In this case, the second area and the third area being identified as the location information of the object may be included. Then, the processor 140 may control the driver 110 to travel avoiding the third area based on the identified location information of the object. Alternatively, the processor 140 may control the driver to travel avoiding the second area together with the third area.

Figure 8D:
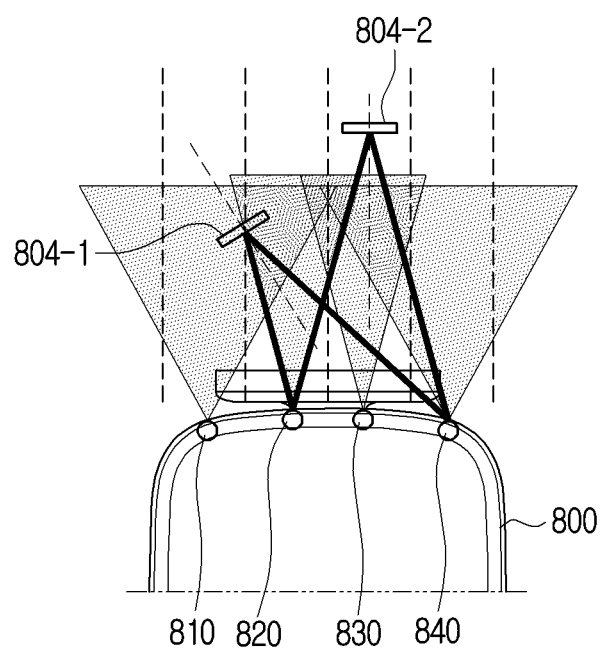

As shown in FIG. 8D, an object being present in a first location 804-1 or a second location 804-2 from among the travel path of the robot 800 may be assumed. The object present in the first location 804-1 may be included in the second area to the third area, and the object present in the second location 804-2 may be included in the fourth area.

The processor 140 may first transmit the first signal during the first time period through the B sensor 820 from among the plurality of sensors 810 to 840 based on a pre-set transmitting order. In this case, the first signal reflected from the object present in the first location 804-1 or the second location 804-2 may be received at the D sensor 840.

The processor 140 may identify, based on the reflected first signal being received at the D sensor 840, the sensor to transmit the second signal during the third time period after the first signal is received as a C sensor 830 based on information mapped with at least one sensor that receives the transmitted signal and a sensor that transmits a signal after the signal is received through the at least one sensor as information stored in the memory 130.

The processor 140 may transmit, based on the sensor to transmit the second signal during the third time period being identified as the C sensor 830, the second signal through the identified C sensor 830. In this case, the processor 140 may identify whether the location of the object is the first location 804-1 or the second location 804-2 based on whether the second signal transmitted through the C sensor 830 is received through the C sensor 830.

The second signal transmitted through the C sensor 830 not being reflected by an object due to the object being present in the first location 804-1 may be assumed. The processor 140 may identify, based on the second reflection signal not being received at the C sensor 830 within the pre-set time, the second area from among the plurality of front areas (the first area, the second area, the third area, the fourth area, the fifth area, and the sixth area) corresponding to the robot 800 as the location information of the object based on the location information of the object corresponding to not receiving of the reflection signal from among the information stored in the memory 130. In this case, an area including the second area and the third area may be identified as the location information of the object. Then, the processor 140 may control the driver 110 to travel avoiding the second area based on the identified location information of the object. Alternatively, the processor 140 may control the driver 110 to travel avoiding the second area and the third area based on the identified location information of the object.

The second signal transmitted through the C sensor 830 being reflected by an object due to the object being present in the second location 804-2 may be assumed. The processor 140 may identify, based on the second reflection signal being received at the C sensor 830 within the pre-set time, the fourth area from among the plurality of front areas (the first area, the second area, the third area, the fourth area, the fifth area, and the sixth area) corresponding to the robot 800 as the location information of the object based on the location information of the object corresponding to receiving of the reflection signal from among the information stored in the memory 130. In this case, the fourth area and the fifth area being identified as the location information of the object may be included. Then, the processor 140 may control the driver 110 to travel avoiding the fourth area based on the identified location information of the object. Alternatively, the processor 140 may control the driver to travel avoiding the fifth area together with the fourth area.

Figure 8E:
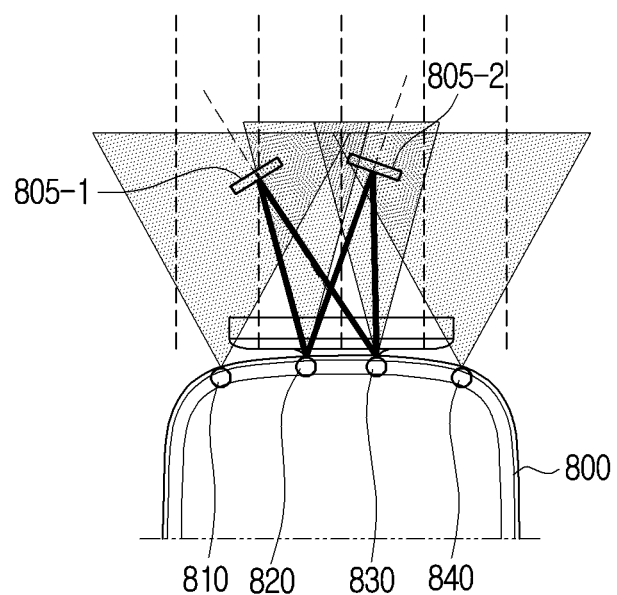

As shown in FIG. 8E, an object being present in a first location 805-1 or a second location 805-2 from among the travel path of the robot 800 may be assumed. The object present in the first location 804-1 may be included in the second area to the third area, and the object present in the second location 804-2 may be included in the fourth area. The processor 140 may first transmit the first signal during the first time period through the B sensor 820 from among the plurality of sensors 810 to 840 based on a pre-set transmitting order. In this case, the first signal reflected from an object present in the first location 805-1 or the second location 805-2 may be received at the C sensor 830. Alternatively, the above may be received at the C sensor 830 and the D sensor 840.

The processor 140 may identify, based on the reflected first signal being received at the C sensor 830 (or, the C sensor 830 and the D sensor 840), the sensor to transmit the second signal during the third time period after the first signal is received as the C sensor 830 based on information mapped with at least one sensor that receives the transmitted signal and a sensor that transmits a signal after the signal is received through the at least one sensor as information stored in the memory 130.

The processor 140 may transmit, based on the sensor to transmit the second signal during the third time period being identified as the C sensor 830, the second signal through the identified C sensor 830. In this case, the processor 140 may identify whether the location of the object is the first location 805-1 or the second location 805-2 based on whether the second signal transmitted through the C sensor 830 is received through the C sensor 830.

The second signal transmitted through the C sensor 830 not being reflected by an object due to the object being present in the first location 805-1 may be assumed. The processor 140 may identify, based on the second reflection signal not being received at the C sensor 830 within the pre-set time, the second area from among the plurality of front areas (the first area, the second area, the third area, the fourth area, the fifth area, and the sixth area) corresponding to the robot 800 as the location information of the object based on the location information of the object corresponding to not receiving of the reflection signal from among the information stored in the memory 130. In this case, the area including the second area and the third area may be identified as the location information of the object. Then, the processor 140 may control the driver 110 to travel avoiding the second area based on the identified location information of the object. Alternatively, the processor 140 may control the driver 110 to travel avoiding the second and third area based on the identified location information of the object.

The second signal transmitted through the C sensor 830 being reflected by an object due to the object being present in the second location 805-2 may be assumed. The processor 140 may identify, based on the second reflection signal being received at the C sensor 830 within the pre-set time, the fourth area from among the plurality of front areas (the first area, the second area, the third area, the fourth area, the fifth area, and the sixth area) corresponding to the robot 800 as the location information of the object based on the location information of the object corresponding to receiving of the reflection signal from among the information stored in the memory 130. In this case, an area including the fourth area and the fifth area being identified as the location information of the object, an area including the third area and the fourth area being identified as the location information of the object, and an area including the third area, the fourth area, and the fifth area being identified as the location information of the object may be included. Then, the processor 140 may control the driver 110 to travel avoiding the fourth area (or, any one from among the area including the fourth area and the fifth area, the area including the third area and the fourth area, and the area including the third area, the fourth area, and the fifth area) based on the identified location information of the object.

Embodiments shown in FIG. 8A to FIG. 8E may be applied the same even when the location of the object is reversed left and right based on the robot, and the location information of the object even when the location of the object is reversed left and right based on the robot may also be stored in the memory 130.

Like a first location of an object corresponding to the sixth area from among the plurality of front areas, and a second location of an object corresponding to the second area to the fourth area from among the plurality of front areas, an object being present at a location that is reversed left and right based on the front area of the robot 800 at the location of the object as in FIG. 8A may be assumed. First, the processor 140 may transmit the first signal during the first time period through the D sensor 840 from among the plurality of sensors 810 to 840 based on a pre-set transmitting order. In this case, the first signal reflected from the object present in the first location or the second location may be received at the A sensor 810. Alternatively, the reflected first signal may be received at the A sensor 810 and the D sensor 840.

The processor 140 may identify, based on the reflected first signal being received at the A sensor 810, the sensor to transmit the second signal during the third time period after the first signal is received as the A sensor 810 based on information mapped with at least one sensor that receives the transmitted signal and a sensor that transmits a signal after the signal is received through the at least one sensor as information stored in the memory 130.

The processor 140 may transmit, based on the sensor to transmit the second signal during the third time period being identified as the A sensor 810, the second signal through the identified A sensor 810. In this case, the processor 140 may identify whether the location of the object is the first location or the second location based on whether the second signal transmitted through the A sensor 810 is received through the A sensor 810.

For example, the second signal transmitted through the A sensor 810 not being reflected by an object due to the object being present in the first location may be assumed. The processor 140 may identify, based on the second reflection signal not being received at the A sensor 810 within the pre-set time, the sixth area from among the plurality of front areas (the first area, the second area, the third area, the fourth area, the fifth area, and the sixth area) corresponding to the robot 800 as the location information of the object based on the location information of the object corresponding to not receiving of the reflection signal from among the information stored in the memory 130. Then, the processor 140 may control the driver 110 to travel avoiding the sixth area based on the identified location information of the object.

The second signal transmitted through the A sensor 810 being reflected by an object due to the object being present in the second location may be assumed. The processor 140 may identify, based on the second reflection signal being received at the A sensor 810 within the pre-set time, the second area and the third area from among the plurality of front areas (the first area, the second area, the third area, the fourth area, the fifth area, and the sixth area) corresponding to the robot 800 as the location information of the object based on the location information of the object corresponding to receiving of the reflection signal from among the information stored in the memory 130. In this case, the first area, the second area, and the third area may be identified as the location information of the object. Then, the processor 140 may control the driver 110 to travel avoiding the second area and the third area based on the identified location information of the object. Alternatively, the processor 140 may control the driver to travel avoiding the first area, the second area, and the third area.

As described in the above, if the location of the object shown in FIG. 8A to FIG. 8E is present in a bilaterally symmetrical location based on the front area of the robot, the processor 140 may be configured such that the sensor corresponding to FIG. 8A to FIG. 8E can transmit a signal using a sensor corresponding to the bilaterally symmetrical location based on the robot. In addition, information about the above-described description may also be pre-stored in the memory 130.

Figure 9A:
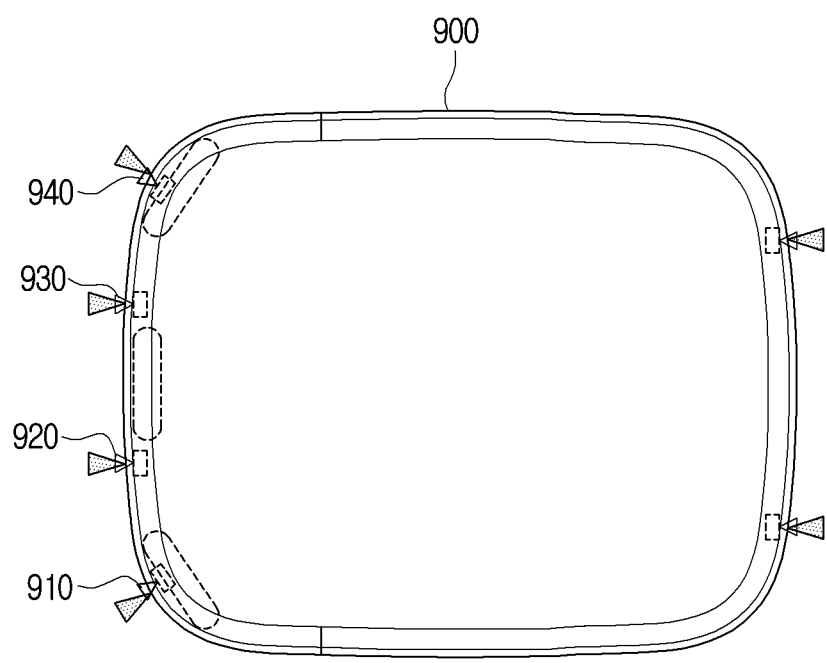
FIG. 9A to FIG. 9C are diagrams illustrating a configuration of a robot according to one or more embodiments.
Figure 9B:
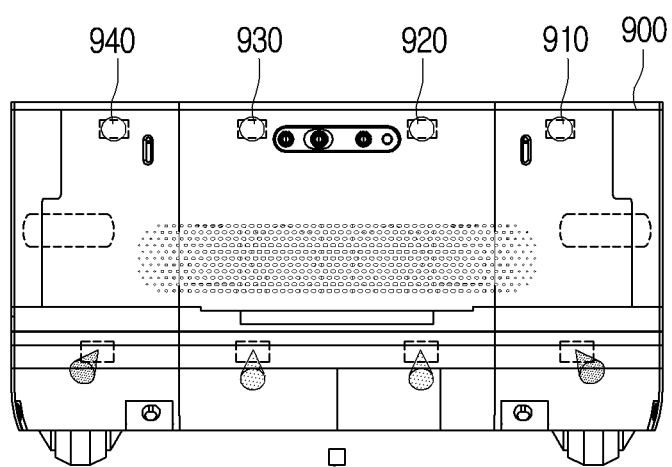
Figure 9C:
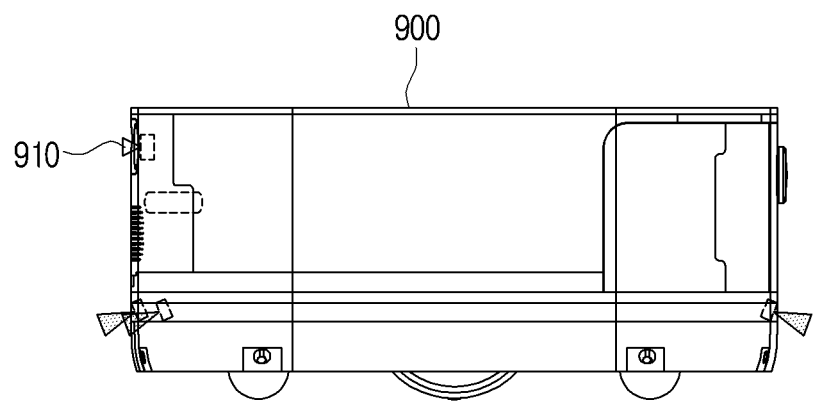

FIG. 9A to FIG. 9C are diagrams illustrating a configuration of a robot according to one or more embodiments.

According to FIG. 9A, a robot 900 may include a plurality of sensors 910 to 940. However, the above is merely one embodiment, and sensors of a different number from a number of sensors shown in FIG. 9A may be included in different locations in the robot 900. The plurality of sensors 910 to 940 may be arranged to face a front direction of the robot 900. The plurality of sensors 910 to 940 may be arranged such that an arrangement distance between the sensors maintains a pre-set value.

Referring to FIG. 9B and FIG. 9C, according to one or more embodiments, the plurality of sensors 910 to 940 may be arranged at the front direction of the robot 900, and arranged at a relatively upper side from among a front surface of the robot 900, but is not limited thereto. The plurality of sensors 910 to 940 may be arranged spaced apart by a pre-set distance at the body part of the robot to transmit a signal at a pre-set angle based on a bottom surface. The pre-set angle may be 15° to 25°, but is not limited thereto.

The plurality of sensors 910 to 940 may include four ultrasonic sensors. In addition, two sensors from among the four ultrasonic sensors may have a first angle of view, and remaining two sensors from among the four ultrasonic sensors may have a second angle of view different from the first angle of view. The sensors 910 and 940 included at a relatively outer side from among the plurality of sensors 910 to 940 may have the first angle of view, and the remaining sensors 920 and 930 may have the second angle of view. The first angle of view may be 60°, and the second angle of view may be 30°, but is not limited to the above. An angle of view of the sensors 910 and 940 arranged at a relatively outer side may be greater in size of the angle of view compared to the sensors 920 and 930 included at a relatively inner side, and accordingly, it may be easy to identify the object located at the outer side of the body part of the robot 900.

Figure 10:
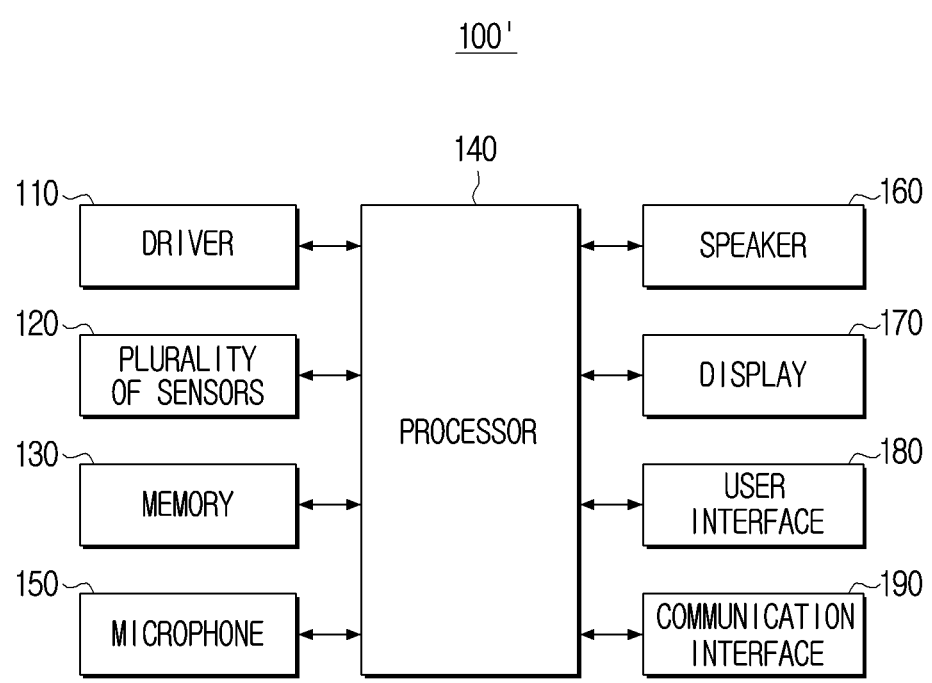
FIG. 10 is a block diagram illustrating a detailed configuration of a robot according to one or more embodiments.

FIG. 10 is a block diagram illustrating a detailed configuration of a robot according to one or more embodiments.

Referring to FIG. 10, a robot 100' may include the driver 110, the plurality of sensors 120, the memory 130, at least one processor 140, a microphone 150, a speaker 160, a display 170, a user interface 180, and a communication interface 190. Detailed descriptions of configurations that overlap with the configurations shown in FIG. 2 from among the configurations shown in FIG. 10 will be omitted.

The microphone 150 may refer to a module that obtains sound and converts to an electric signal, and may be a condenser microphone, a ribbon microphone, a moving-coil microphone, a piezoelectric device microphone, a carbon microphone, or a micro electro mechanical system (MEMS) microphone. In addition, the above may be implemented in an omnidirectional method, a bidirectional method, a unidirectional method, a sub cardioid method, a super cardioid method, or a hyper cardioid method.

The speaker 160 may be formed of a tweeter for playing high-range sound, a midrange for playing mid-range sound, a woofer for laying low-range sound, a sub-woofer for playing ultra-low range sound, an enclose for controlling resonance, a cross-over network dividing electric signal frequencies which are input to the speaker into bandwidths.

The speaker 160 may output sound signals to outside of the robot 100'. The speaker 160 may output playing of multi-media, playing of recordings, various notification sounds, voice messages. The robot 100' may include audio output devices such as the speaker 160, but may include an output device such as an audio output terminal. Specifically, the speaker 160 may provide obtained information, information processed and manufactured based on the obtained information, a response result or operation result for a user voice in a voice form.

The display 170 may be formed of a display including self-emissive devices or a display including non-emissive devices and a backlight. For example, the display 170 may be implemented as a display of various types such as, for example, and without limitation, a liquid crystal display (LCD), an organic light emitting diode (OLED) display, a light emitting diode (LED), a micro LED, a mini LED, a plasma display panel (PDP), a quantum dot (QD) display, a quantum dot light emitting diodes (QLED). In the display 170, a driving circuit, which may be implemented in the form of an a-si TFT, a low temperature poly silicon (LTPS) TFT, an organic TFT (OTFT), a backlight unit may be included. The display 170 may be implemented as a touch screen coupled with a touch sensor, a flexible display, a rollable display, a three-dimensional display (3D display), a display physically coupled with a plurality of display modules. The processor 140 may control the display 170 to output an output image obtained according to the various embodiments described above. Here, the output image may be a high-resolution image of 4K or greater than or equal to 8K.

The user interface 180 may be a configuration for the robot 100' to perform an interaction with a user. For example, the user interface 180 may include at least one from among a touch sensor, a motion sensor, a button, a jog dial, a switch, a microphone, or a speaker, but is not limited thereto.

The communication interface 190 may input and output data of various types. For example, the communication interface 190 may transmit and receive data of various types with an external device (e.g., source device), an external storage medium (e.g., a USB memory), or an external server (e.g., WEBHARD) through communication methods such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial.

The communication interface 190 may include Bluetooth low energy (BLE) module. The BLE may refer to Bluetooth technology capable of transmitting and receiving low-power and low-capacity data in a 2.4 GHz frequency bandwidth having a reach radius of about 10 m. However, the above is not limited thereto, and the communication interface 190 may include a Wi-Fi communication module. That is, the communication interface 190 may include at least one from among the BLE module or the Wi-Fi communication module.

According to the above-described example, the robot 100' may identify a sensor operating in the signal transmitting mode (i.e., an order of the sensor operating in the signal transmitting mode) during a plurality of pre-set time periods based on information stored in the memory 130, and accurately and quickly identify a location of an object by transmitting a signal using the identified sensor. That is, the location of the object may be accurately determined through the plurality of sensors included in the robot 100', and an object identification time may be minimized through the adaptive detection algorithm.

Methods described above may be implemented in an application form installable in a robot of the related art. Alternatively, methods described above may be performed using a deep learning-based trained neural network (or deep trained neural network), that is, a learning network model. In addition, the methods described above may be implemented with only a software upgrade, or a hardware upgrade for the robot of the related art. In addition, the various embodiments described above may be performed through an embedded server provided in the robot, or an external server of the robot.

The various embodiments described above may be implemented with software including instructions stored in a machine-readable storage media (e.g., computer). The machine may call an instruction stored in the storage medium, and as a device operable according to the called instruction, may include an electronic device (e.g., electronic device (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, each of the elements (e.g., a module or a program) according to the various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the above has been illustrated and described with reference to example embodiments thereof, it will be understood that the disclosed embodiments is intended to be illustrative, not limiting. It will be understood by those skilled in the art that various changes in form and details may be made therein without departing from the true spirit and full scope, including the appended claims and their equivalents.

What is claimed is:

1. A robot, comprising:
a driver;
a plurality of sensors;
a memory configured to store information mapped with (i) at least one sensor of the plurality of sensors that is configured to receive a transmitted signal and (ii) a sensor of the plurality of sensors that is configured to transmit a signal after the transmitted signal is received through the at least one sensor for the plurality of sensors, respectively, operating in a signal transmitting mode; and
at least one processor configured to
transmit a first signal for identifying a presence or absence of an object within a sensing area of the plurality of sensors through a first sensor operating in the signal transmitting mode from among the plurality of sensors during a first time period,
identify, based on the first signal being reflected from the object during a second time period after elapse of the first time period and received in at least one sensor operating in a signal receiving mode from among the plurality of sensors, a second sensor to transmit a second signal during a third time period after elapse of the second time period from among the plurality of sensors based on the information stored in the memory and at least one sensor to which a first reflection signal corresponding to the first signal is received,
transmit the second signal by operating the identified second sensor in the signal transmitting mode,
identify a location of the object based on whether a second reflection signal corresponding to the second signal is received at the second sensor, and
control the driver to travel by avoiding the object based on the identified location of the object.

2. The robot of claim 1,
wherein the information stored in the memory includes location information of the object according to whether the second sensor receives the second reflection signal corresponding to the second signal transmitted by the second sensor transmitting the second signal after the second signal is received, and
wherein the at least one processor is further configured to identify the location of the object based on whether the second reflection signal is received at the second sensor and information stored in the memory.

3. The robot of claim 2,
wherein the location information of the object stored in the memory includes location information about at least one from among a plurality of first front areas corresponding to a body part of the robot and a plurality of second front areas corresponding to an outer side of the body part of the robot, and
wherein the at least one processor is further configured to identify, based on the second reflection signal being received at the second sensor within a pre-set time, at least one area of the plurality of first front areas and the plurality of second front areas as a location corresponding to the object based on first location information among the information stored in the memory.

4. The robot of claim 3, wherein the at least one processor is further configured to identify, based on the second reflection signal not being received at the second sensor within the pre-set time, at least one area of the plurality of first front areas and the plurality of second front areas as a location corresponding to the object based on second location information from among the information stored in the memory.

5. The robot of claim 1, wherein the at least one processor is further configured to transmit, based on the first reflection signal not being received in at least one sensor from among the plurality of sensors during a pre-set time from a time-point at which the first signal is transmitted, the first signal by operating a third sensor with a transmitting order after the first sensor from among the plurality of sensors in the signal transmitting mode according to a pre-set transmitting order corresponding to the plurality of sensors.

6. The robot of claim 1, wherein the at least one processor is further configured to
identify, based on the first signal being reflected from the object and received in at least one sensor from among the plurality of sensors, a distance with the object based on a transmitting time-point of the first signal and a receiving time-point of the first reflection signal, and
identify, based on the identified distance being within a pre-set distance, the second sensor to transmit the signal during the third time period from among the plurality of sensors based on information stored in the memory and at least one sensor that received the first reflection signal and transmit the second signal by operating the identified second sensor in the signal transmitting mode.

7. The robot of claim 1, wherein the plurality of sensors is configured to be spaced apart by a pre-set distance to a body part of the robot to transmit a signal at a pre-set angle based on a bottom surface.

8. The robot of claim 1,
wherein the plurality of sensors comprises four ultrasonic sensors,
wherein two sensors from among the four ultrasonic sensors have a first angle of view, and
wherein remaining two sensors from among the four ultrasonic sensors have a second angle of view different from the first angle of view.

9. A control method of a robot storing, in a memory, information mapped with (i) at least one sensor of a plurality of sensors that is configured to receive a transmitted signal and (ii) a sensor of the plurality of sensors that is configured to transmit a signal after the signal is received through the at least one sensor for a plurality of sensors, respectively, operating in a signal transmitting mode, the method comprising:
transmitting a first signal for identifying a presence or absence of an object within a sensing area of the plurality of sensors through a first sensor operating in the signal transmitting mode from among the plurality of sensors during a first time period;
identifying, based on the first signal being reflected from the object during a second time period after elapse of the first time period and received in at least one sensor operating in a signal receiving mode from among the plurality of sensors, a second sensor to transmit a second signal during a third time period after elapse of the second time period from among the plurality of sensors based on the stored information and at least one sensor to which a first reflection signal corresponding to the first signal is received;
transmitting the second signal by operating the identified second sensor in the signal transmitting mode;
identifying a location of the object based on whether a second reflection signal corresponding to the second signal is received at the second sensor; and
traveling by avoiding the object based on the identified location of the object.

10. The method of claim 9, wherein
wherein the information stored in the memory includes location information of the object according to whether the second sensor receives the second reflection signal corresponding to the second signal transmitted by the second sensor configured to transmit a second signal after the second signal is received, and
wherein the identifying a location of the object comprises identifying a location of the object based on whether the second reflection signal is received at the second sensor and information stored in the memory.

11. The method of claim 10,
wherein the location information of the object stored in the memory includes location information about at least one from among a plurality of first front areas corresponding to a body part of the robot and a plurality of second front areas corresponding to an outer side of the body part of the robot, and
wherein the identifying the location of the object comprises identifying, based on the second reflection signal being received at the second sensor within a pre-set time, at least one area of the plurality of first front areas and the plurality of second front areas as a location corresponding to the object based on first location information from among the information stored in the memory.

12. The method of claim 11, wherein the identifying the location of the object further comprises: identifying, based on the second reflection signal not being received at the second sensor within the pre-set time, at least one area of the plurality of first front areas and the plurality of second front areas as a location corresponding to the object based on second location information from among the information stored in the memory.

13. The method of claim 9, further comprising: transmitting, based on the first reflection signal not being received in at least one sensor from among the plurality of sensors during a pre-set time from a time-point at which the first signal is transmitted, the first signal by operating a third sensor with a transmitting order after the first sensor from among the plurality of sensors in the signal transmitting mode according to a pre-set transmitting order corresponding to the plurality of sensors.

14. The method of claim 9, wherein the identifying the second sensor comprises:
identifying, based on the first signal being reflected from the object and received in at least one sensor from among the plurality of sensors, a distance with the object based on a transmitting time-point of the first signal and a receiving time-point of the first reflection signal; and
identifying, based on the identified distance being within a pre-set distance, the second sensor to transmit a signal during the third time period from among the plurality of sensors based on information stored in the memory and at least one sensor that received the first reflection signal.

15. A non-transitory computer-readable recording medium configured to store computer instructions for a robot storing, in a memory, information mapped with (i) at least one sensor of a plurality of sensors that is configured to receive a transmitted signal and (ii) a sensor of the plurality of sensors that is configured to transmit a signal after the signal is received through the at least one sensor for a plurality of sensors, respectively, operating in a signal transmitting mode, to perform an operation when executed by a processor of the robot, the operation comprising:
transmitting a first signal for identifying a presence or absence of an object within a sensing area of a plurality of sensors through a first sensor operating in a signal transmitting mode from among the plurality of sensors during a first time period;
identifying, based on the first signal being reflected from the object during a second time period after elapse of the first time period and received in at least one sensor operating in a signal receiving mode from among the plurality of sensors, a second sensor to transmit a second signal during a third time period after elapse of the second time period from among the plurality of sensors based on the stored information and at least one sensor to which the first reflection signal corresponding to the first signal is received;
transmitting the second signal by operating the identified second sensor in the signal transmitting mode;
identifying a location of the object based on whether a second reflection signal corresponding to the second signal is received at the second sensor; and
traveling by avoiding the object based on the identified location of the object.

16. The non-transitory computer-readable recording medium of claim 15, wherein
wherein the information stored in the memory includes location information of the object according to whether the second sensor receives the second reflection signal corresponding to the second signal transmitted by the second sensor configured to transmit a second signal after the second signal is received, and
wherein the identifying a location of the object comprises identifying a location of the object based on whether the second reflection signal is received at the second sensor and information stored in the memory.

17. The non-transitory computer-readable recording medium of claim 16,
wherein the location information of the object stored in the memory includes location information about at least one from among a plurality of first front areas corresponding to a body part of the robot and a plurality of second front areas corresponding to an outer side of the body part of the robot, and
wherein the identifying the location of the object comprises identifying, based on the second reflection signal being received at the second sensor within a pre-set time, at least one area of the plurality of first front areas and the plurality of second front areas as a location corresponding to the object based on first location information of an object corresponding to receiving of the signal from among information stored in the memory.

18. The non-transitory computer-readable recording medium of claim 17, wherein the identifying the location of the object further comprises: identifying, based on the second reflection signal not being received at the second sensor within the pre-set time, at least one area of the plurality of first front areas and the plurality of second front areas as a location corresponding to the object based on second location information of an object corresponding to not receiving of the signal from among the information stored in the memory.

19. The non-transitory computer-readable recording medium of claim 15, further comprising: transmitting, based on the first reflection signal not being received in at least one sensor from among the plurality of sensors during a pre-set time from a time-point at which the first signal is transmitted, the first signal by operating a third sensor with a transmitting order after the first sensor from among the plurality of sensors in the signal transmitting mode according to a pre-set transmitting order corresponding to the plurality of sensors.

20. The non-transitory computer-readable recording medium of claim 15, wherein the identifying the second sensor comprises:
- identifying, based on the first signal being reflected from the object and received in at least one sensor from among the plurality of sensors, a distance with the object based on a transmitting time-point of the first signal and a receiving time-point of the first reflection signal; and
- identifying, based on the identified distance being within a pre-set distance, the second sensor to transmit a signal during the third time period from among the plurality of sensors based on information stored in the memory and at least one sensor that received the first reflection signal.

* * * * *